United States Patent
Jaygarl et al.

(10) Patent No.: US 10,832,674 B2
(45) Date of Patent: Nov. 10, 2020

(54) VOICE DATA PROCESSING METHOD AND ELECTRONIC DEVICE SUPPORTING THE SAME

(71) Applicant: Samsung Electronics Co., Ltd., Gyeonggi-do (KR)

(72) Inventors: Ho Jun Jaygarl, Gyeonggi-do (KR); Hyun Woo Kang, Gyeonggi-do (KR); Jae Hwan Lee, Gyeonggi-do (KR); Han Jun Ku, Gyeonggi-do (KR); Nam Hoon Kim, Gyeonggi-do (KR); Eun Taek Lim, Gyeonggi-do (KR); Da Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 16/106,929

(22) Filed: Aug. 21, 2018

(65) Prior Publication Data

US 2019/0066677 A1  Feb. 28, 2019

(30) Foreign Application Priority Data

Aug. 22, 2017  (KR) .......................... 10-2017-0106351

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/167* (2013.01); *G10L 15/265* (2013.01); *G10L 15/30* (2013.01); *G10L 2015/223* (2013.01)

(58) Field of Classification Search
CPC ... G10L 15/22; G10L 2015/223; G10L 15/26; G10L 15/265; G10L 15/30; G10L 17/22;
(Continued)

(56) References Cited

U.S. PATENT DOCUMENTS

| 6,615,172 B1 * | 9/2003 | Bennett | G06F 16/24522 |
| | | | 704/257 |
| 7,299,186 B2 * | 11/2007 | Kuzunuki | G10L 15/22 |
| | | | 704/270.1 |

(Continued)

FOREIGN PATENT DOCUMENTS

| CN | 102262879 A | 11/2011 |
| KR | 10-2014-0053760 A | 5/2014 |

OTHER PUBLICATIONS

International Search Report dated Nov. 28, 2018.
European Search Report dated Jun. 19, 2020.

*Primary Examiner* — Edgar X Guerra-Erazo
(74) *Attorney, Agent, or Firm* — Cha & Reiter, LLC.

(57) ABSTRACT

An electronic device and method are disclosed. The electronic device includes a touchscreen, microphone, speaker, wireless communication circuit, processor and memory. The memory stores instructions executable by the processor to: receive a first user utterance through the microphone, transmit, by the wireless communication circuit, the received first user utterance to an external server through the wireless communication circuit, receive, by the wireless communication circuit, first text data generated by the external server using automatic speech recognition (ASR), when the first text data includes at least one pre-stored word, phrase, and sentence, identifying a plurality of tasks mapped to the at least one pre-stored word, phrase, and sentence, and execute the identified plurality of tasks using at least one of sequential execution or parallel execution.

19 Claims, 27 Drawing Sheets

(51) Int. Cl.
*G06F 3/16* (2006.01)
*G10L 15/26* (2006.01)

(58) Field of Classification Search
CPC ............... G10L 2015/088; G10L 15/08; G10L 2015/225; G10L 13/27; G06F 3/167
See application file for complete search history.

(56) References Cited

U.S. PATENT DOCUMENTS

| | | |
|---|---|---|
| 8,364,481 B2 | 1/2013 | Strope et al. |
| 8,571,860 B2 | 10/2013 | Strope et al. |
| 8,589,156 B2 | 11/2013 | Burke et al. |
| 8,650,030 B2 * | 2/2014 | Hafsteinsson .......... G06F 3/167 704/235 |
| 8,856,005 B2 * | 10/2014 | Hafsteinsson .......... G10L 15/22 704/235 |
| 9,026,431 B1 | 5/2015 | Moreno et al. |
| 9,373,329 B2 | 6/2016 | Strope et al. |
| 9,600,229 B2 * | 3/2017 | Hafsteinsson .......... G10L 15/26 |
| 9,858,928 B2 * | 1/2018 | Hafsteinsson .......... H04W 4/14 |
| 9,953,643 B2 | 4/2018 | Locker et al. |
| 9,966,065 B2 | 5/2018 | Gruber et al. |
| 10,049,672 B2 | 8/2018 | Strope et al. |
| 10,163,441 B2 * | 12/2018 | Hafsteinsson .......... G10L 15/22 |
| 10,431,223 B2 * | 10/2019 | Hafsteinsson .......... G06F 3/167 |
| 10,509,680 B2 * | 12/2019 | Kumar ................. G06F 9/4881 |
| 2004/0054539 A1 * | 3/2004 | Simpson ................. G10L 15/30 704/270.1 |
| 2004/0120473 A1 * | 6/2004 | Birch ................... H04M 3/4938 379/88.17 |
| 2004/0172254 A1 * | 9/2004 | Sharma ................. G10L 15/26 704/270.1 |
| 2005/0033582 A1 * | 2/2005 | Gadd .................... G06Q 30/02 704/277 |
| 2006/0009980 A1 | 1/2006 | Burke et al. |
| 2006/0235694 A1 * | 10/2006 | Cross .................... G06F 16/95 704/270.1 |
| 2007/0027692 A1 * | 2/2007 | Sharma ................. A61K 8/411 704/270.1 |
| 2007/0100690 A1 * | 5/2007 | Hopkins ............ G06Q 30/0271 705/14.67 |
| 2008/0162141 A1 * | 7/2008 | Lortz .................... G10L 15/26 704/270.1 |
| 2008/0243501 A1 * | 10/2008 | Hafsteinsson .......... G10L 15/26 704/235 |
| 2010/0004930 A1 | 1/2010 | Strope et al. |
| 2012/0166184 A1 | 6/2012 | Looker et al. |
| 2013/0138440 A1 | 5/2013 | Strope et al. |
| 2014/0058728 A1 | 2/2014 | Strope et al. |
| 2015/0348551 A1 | 12/2015 | Gruber et al. |
| 2016/0259791 A1 | 9/2016 | Vizer et al. |
| 2016/0275951 A1 | 9/2016 | Strope et al. |
| 2018/0143854 A1 * | 5/2018 | Kumar .................. G06F 9/505 |
| 2018/0330735 A1 | 11/2018 | Strope et al. |
| 2018/0350353 A1 | 12/2018 | Gruber et al. |
| 2020/0035236 A1 * | 1/2020 | Hafsteinsson .......... G06F 3/167 |

* cited by examiner

VOICE DATA PROCESSING METHOD AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0106351, filed on Aug. 22, 2017, in the Korean Intellectual Property Office, the disclosure of which is incorporated by reference herein its entirety.

TECHNICAL FIELD

The present disclosure relates to a voice data processing technology.

BACKGROUND

An artificial intelligence system (or an "integrated intelligent system") refers to a system self-learning and forming determinations, thereby improving a recognition rate the longer it is utilized in operation. One example is a computer system in which some form of human intelligence is simulated by the computer system.

An artificial intelligence technology may include a machine learning (i.e., "deep learning") techniques using a machine learning algorithm that classifies and/or learns the characteristics of pieces of input data, in tandem with component technologies that simulate functions of the human brain, such as the operations of, for example, recognition, determination, and the like.

For example, the component technologies may include one or more of a language-recognition technology that recognizes a language or a character of a human, a visual understanding technology that recognizes objects like human vision, an inference or prediction technique that determines information to logically infer and predict the determined information, a knowledge expression technology that processes human experience information as knowledge data, and an operation control technology that controls autonomous driving of the vehicle and the motion of the robot.

The linguistic understanding among the above-described elementary technologies includes natural language processing, machine translation, dialogue system, query response, speech recognition/synthesis, and the like as a technology to recognize and apply/process human language/characters.

In the meantime, an electronic device equipped with an artificial intelligence system may analyze voice data entered by a user's utterance, may determine a task, which is to be performed in an electronic device or an external electronic device connected to the electronic device, based on the analyzed result, may allow the task to be performed by the electronic device or the external electronic device.

The above information is presented as background information only to assist with an understanding of the present disclosure. No determination has been made, and no assertion is made, as to whether any of the above might be applicable as prior art with regard to the present disclosure.

SUMMARY

However, in the case where an electronic device performs a plurality of tasks through a user's utterance, the electronic device has no chance but to receive a voice command for requesting the execution of a task for each task. That is, the electronic device has no chance but to perform only one task in response to one voice command entered by the user's utterance. In addition, only in the case where the voice command for requesting the execution of a task includes an expression associated with the task, such as a word, phrase, or sentence, the electronic device may perform the task.

Aspects of the present disclosure are to address at least the above-mentioned problems and/or disadvantages and to provide at least the advantages described below. Accordingly, an aspect of the present disclosure is to provide a method of processing voice data associated with a voice command for requesting the execution of a plurality of tasks, and an electronic device supporting the same.

In accordance with an aspect of the present disclosure, an electronic device includes a touchscreen, a microphone, a wireless communication circuit, at least one processor operatively coupled to the touchscreen, the microphone, and the wireless communication circuit, and at least one memory storing programming instructions executable by the at least one processor to cause the electronic device to receive a first user utterance through the microphone, transmit, by the wireless communication circuit, the received first user utterance to an external server through the wireless communication circuit, receive, by the wireless communication circuit, first text data generated by the external server, when the first text data includes at least one pre-stored word, phrase, and sentence, identifying at least one task mapped to the at least one pre-stored word, phrase, and sentence, and execute the identified at least one task using at least one of sequential execution or parallel execution.

In accordance with another aspect of the present disclosure, an electronic device includes a microphone, a communication circuit, at least one processor electrically coupled to the microphone and the communication circuit a memory storing programming instructions executable by the at least one processor to cause the electronic device to store a first expression mapped to first information associated with a plurality of first tasks, receive a first voice input of a user through the microphone, transmit the first voice input to an external server through the communication circuit, receive first text data generated by the external server to the transmitted first voice input from the external server through the communication circuit, search the memory for any stored expression matching the first text data, when the first expression is identified as matching the first text data, transmit the first information associated with the plurality of first tasks to the external server through the communication circuit, receive, from the external server through the communication circuit, second information indicating a sequence of states of the electronic device related to executing the plurality of first tasks identified by the external server as matching the first information, execute the plurality of first tasks according to the second information, wherein the first expression includes at least one of specified word, a specified phrase, and a specified sentence.

In accordance with another aspect of the present disclosure, a voice data processing method in an electronic device is disclosed, including: storing by a memory a first expression mapped to first information about a plurality of first tasks, receiving a first voice input of a user through a microphone, transmitting the received first voice input to an external server through a communication circuit, receiving a first text data generated by the application of automatic speech recognition (ASR) by the external server to the first voice input, from the external server through the communication circuit, searching the memory for any stored expression matching the first text data, when the first expression is identified as matching the first text data, transmitting the first information associated with the plurality of first tasks to the external server through the communication circuit, receiving, from the external server through the communication circuit, second information indicating a sequence of states of the electronic device related to executing the plurality of first tasks identified by the external server as matching the first information, and executing the plurality of first tasks according to the second information, wherein the first expression includes at least one of a specified word, a specified phrase, and a specified sentence.

In accordance with another aspect of the present disclosure, an electronic device includes a microphone, a communication circuit, a processor electrically connected to the microphone and the communication circuit, and a memory electrically connected to the processor and storing an expression mapped to information about a plurality of tasks. The memory stores instructions that, when executed, allow the processor to receive the voice input of the user through the microphone, to transmit voice data corresponding to the voice input to an external server capable of performing ASR, through the communication circuit, to receive the text data generated as the result of the ASR associated with the voice data, from the external server through the communication circuit, to search for the expression corresponding to the text data in the memory, to perform the plurality of tasks by using information about the plurality of tasks when the expression corresponding to the text data is present. The information about the plurality of tasks includes information about a sequence of states of the electronic device for performing the plurality of tasks. The expression includes specified words, phrases, or sentences that are different from voice commands for explicitly requesting the execution of the plurality of tasks.

According to various embodiments of the present disclosure, it is possible to assign a voice command for requesting the execution of a task to a specific expression, thereby performing the task through an easy and convenient utterance.

Also, according to various embodiments of the present disclosure, it is possible to perform a plurality of tasks through an utterance of one specified expression, thereby quickly and conveniently performing the tasks through an utterance.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Prior to describing an embodiment of the present disclosure, an integrated intelligent system to which an embodiment of the present disclosure is capable of being applied will be described.

Figure 1:
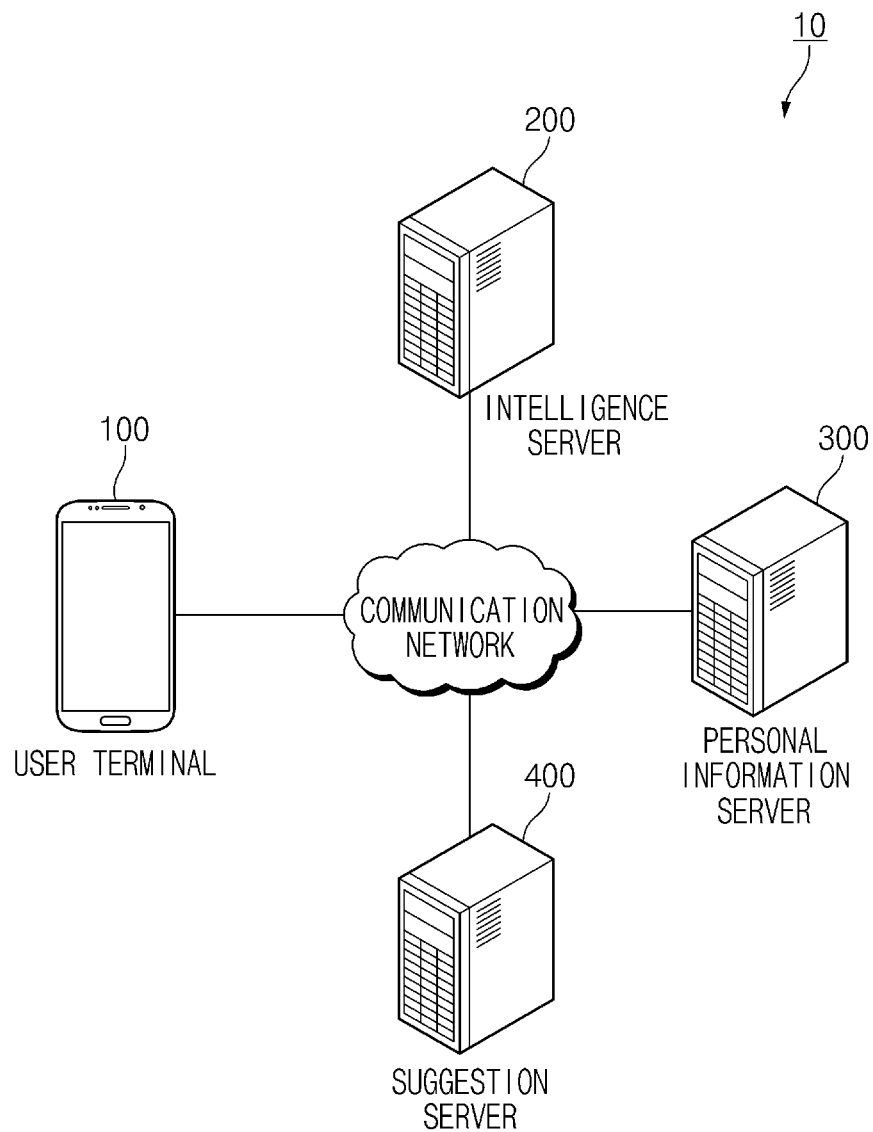
FIG. 1 is a view illustrating an integrated intelligent system, according to various embodiments of the present disclosure.

FIG. 1 is a view illustrating an integrated intelligent system, according to various embodiments of the present disclosure.

Referring to FIG. 1, an integrated intelligent system 10 may include a user terminal 100, an intelligence server 200, a personal information server 300, or a suggestion server 400.

The user terminal 100 may provide a service for a user through an app (or an application program) (e.g., an alarm app, a message app, a picture (gallery) app, or the like) stored in the user terminal 100. For example, the user terminal 100 may launch and operate another app through an intelligence app (or speech recognition app) stored in the user terminal 100. The user terminal 100 may receive a user input for launching or operating the other app through the intelligence app. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter utilized to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may indicate, but is not limited to, the sequence of states in which an electronic device performs the task requested by the user. In other words, the path rule may include information about the sequence of the states. For example, the task may be a certain action that the intelligence app is capable of providing. The task may include the generation of a schedule, the transmission of a picture to the desired other party, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feed forward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display the result of a part of the plurality of actions in the display. For example, the user terminal 100 may display the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may receive the user information from the personal information server 300 over the communication network and may use the user information when generating a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may receive the user information of the user terminal 100 from the personal information server 300 and may include the database storing information about a function that a user is capable of utilizing. The user terminal 100 may receive information about the function to be provided from the suggestion server 400 over the communication network and may provide the received information to the user.

Figure 2:
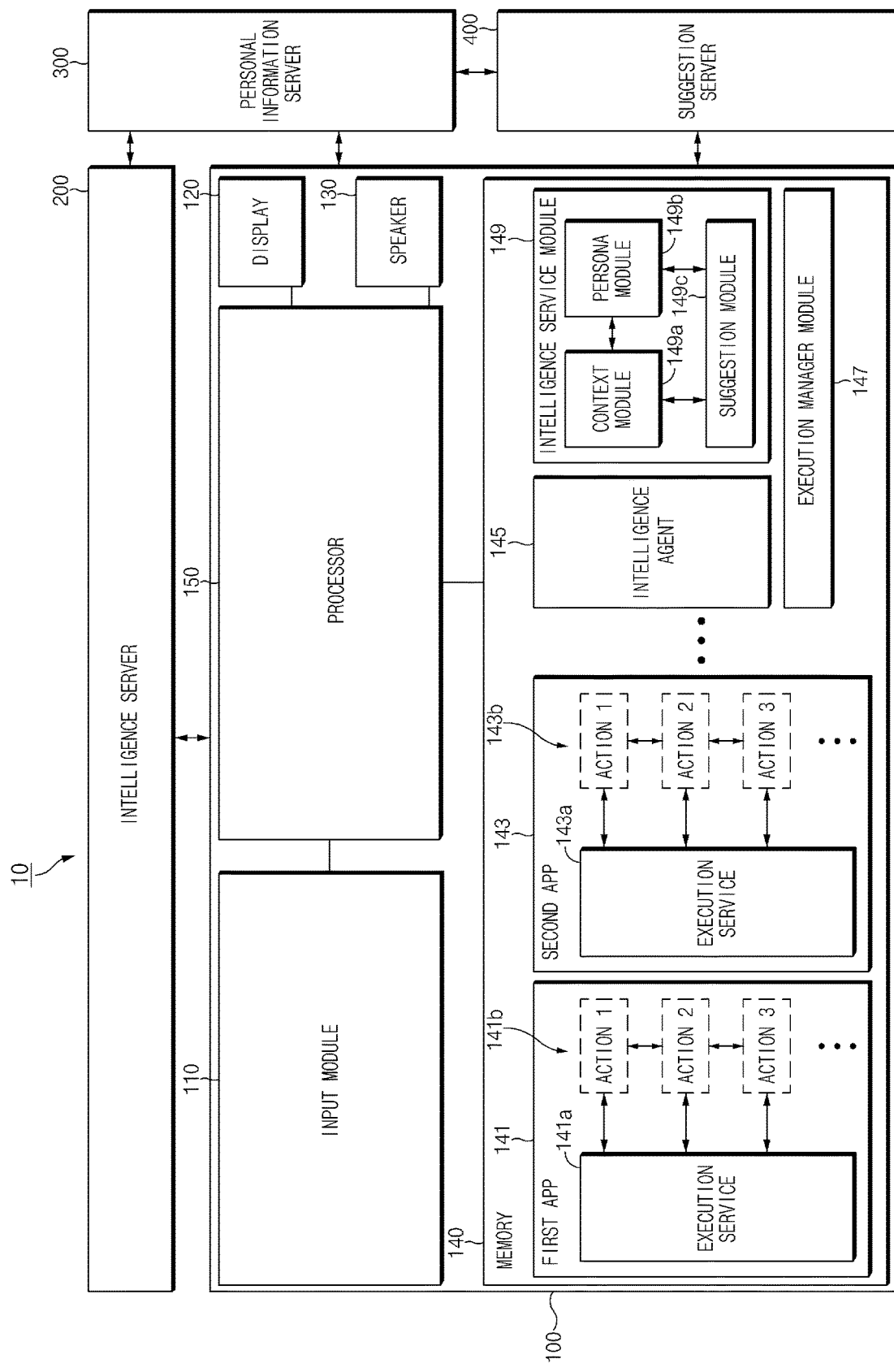
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone that is capable of receiving the utterance of the user as a sound signal. For example, the input module 110 may include a speech input system and may receive the utterance of the user as a sound signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the sound signal. For example, the speaker 130 may output the voice signal generated in the user terminal 100 to the outside. According to an embodiment, the speaker 130 may be exposed to a part (e.g., a third part) of the housing.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147 and the intelligence service module 149 may be a framework (or application framework) for processing the received user input (e.g., user utterance).

According to an embodiment, the memory 140 may include a database capable of storing information utilized to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. In other words, the execution service modules 141a and 143a may be activated by the execution manager module 147, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter utilized for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps 141 and 143 are launched, the plurality of apps 141 and 143 may be sequentially launched. For example, when receiving the completion information after the execution of the last action (e.g., action 3 of the first app 141) of the first app 141 is executed, the execution manager module 147 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, a part of a plurality of result screens according to the executed plurality of the actions 141b and 143b may be displayed in the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate a command for launching an app based on the voice signal received as the user input. According to an embodiment, the processor 150 may execute the execution manager module 147 to launch the apps 141 and 143 stored in the memory 140 depending on the generated command. According to an embodiment, the processor 150 may execute the intelligence service module 149 to manage information of a user and may process a user input by using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. In the case where the intelligence agent 145 is executed, an intelligence app (e.g., a speech recognition app) operating in conjunction with the intelligence agent 145 may be executed.

According to an embodiment, the intelligence agent 145 may include an utterance recognition module for performing the user input. The processor 150 may recognize the user input for executing an action in an app through the utterance recognition module. For example, the processor 150 may recognize a limited user (voice) input (e.g., an utterance such as "click" for performing a capture operation when a camera app is being executed) for performing an action such as the wakeup command in the apps 141 and 143 through the utterance recognition module. For example, the processor 150 may assist the intelligence server 200 to recognize and rapidly process a user command capable of being processed in the user terminal 100 through the utterance recognition module. According to an embodiment, the utterance recognition module of the intelligence agent 145 for executing a user input may be implemented in an app processor.

According to an embodiment, the utterance recognition module (including the utterance recognition module of a wake up module) of the intelligence agent 145 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147;

and the processor 150 may receive completion information of the actions 141*b* and 143*b* from the apps 141 and 143.

According to an embodiment, the processor 150 may execute the execution manager module 147 to transmit the command information (e.g., path rule information) for executing the actions 141*b* and 143*b* of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141*b* and 143*b* included in the path rule to the apps 141 and 143. For example, the processor 150 may sequentially transmit the actions 141*b* and 143*b* included in the path rule to the apps 141 and 143, through the execution manager module 147 and may sequentially execute the actions 141*b* and 143*b* of the apps 141 and 143 depending on the path rule.

According to an embodiment, the processor 150 may execute the execution manager module 147 to manage execution states of the actions 141*b* and 143*b* of the apps 141 and 143. For example, the processor 150 may receive information about the execution states of the actions 141*b* and 143*b* from the apps 141 and 143, through the execution manager module 147. For example, in the case where the execution states of the actions 141*b* and 143*b* are in partial landing (e.g., in the case where a parameter utilized for the actions 141*b* and 143*b* are not input), the processor 150 may transmit information about the partial landing to the intelligence agent 145, through the execution manager module 147. The processor 150 may make a request for an input of information (e.g., parameter information) to the user by using the received information through the intelligence agent 145. For another example, in the case where the execution state of each of the actions 141*b* and 143*b* is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141*b* and 143*b* to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may receive a plurality of path rules through the execution manager module 147 based on the utterance of a user. For example, in the case where the user utterance specifies one app 141 executing one action 141*b* but does not specify the other app 143 executing the other action 143*b*, the processor 150 may receive a plurality of different path rules, in which the same app 141 (e.g., gallery app) executing the one action 141*b* is executed and in which the different app 143 (e.g., message app or Telegram app) executing the other action 143*b* is executed, through the execution manager module 147. For example, the processor 150 may execute the same actions 141*b* and 143*b* (e.g., the same successive actions 141*b* and 143*b*) of the plurality of path rules, through the execution manager module 147. In the case where the execution manager module 147 executes the same action, the processor 150 may display a state screen for selecting the different apps 141 and 143 respectively included in the plurality of path rules in the display 120, through the execution manager module 147.

According to an embodiment, the intelligence service module 149 may include a context module 149*a*, the persona module 149*b*, or a suggestion module 149*c*.

The processor 150 may execute the context module 149*a* to collect current states of the apps 141 and 143 from the apps 141 and 143. For example, the processor 150 may execute the context module 149*a* to receive context information indicating the current states of the apps 141 and 143 and may collect the current states of the apps 141 and 143 through the received context information.

The processor 150 may execute the persona module 149*b* to manage personal information of the user utilizing the user terminal 100. For example, the processor 150 may execute the persona module 149*b* to collect usage information and the execution result of the user terminal 100 and may manage the personal information of the user by using the collected usage information and the collected execution result of the user terminal 100.

The processor 150 may execute the suggestion module 149*c* to predict the intent of the user and may recommend a command to the user based on the intent of the user. For example, the processor 150 may execute the suggestion module 149*c* to recommend a command to the user depending on the current state (e.g., a time, a place, a situation, or an app) of the user.

Figure 3:
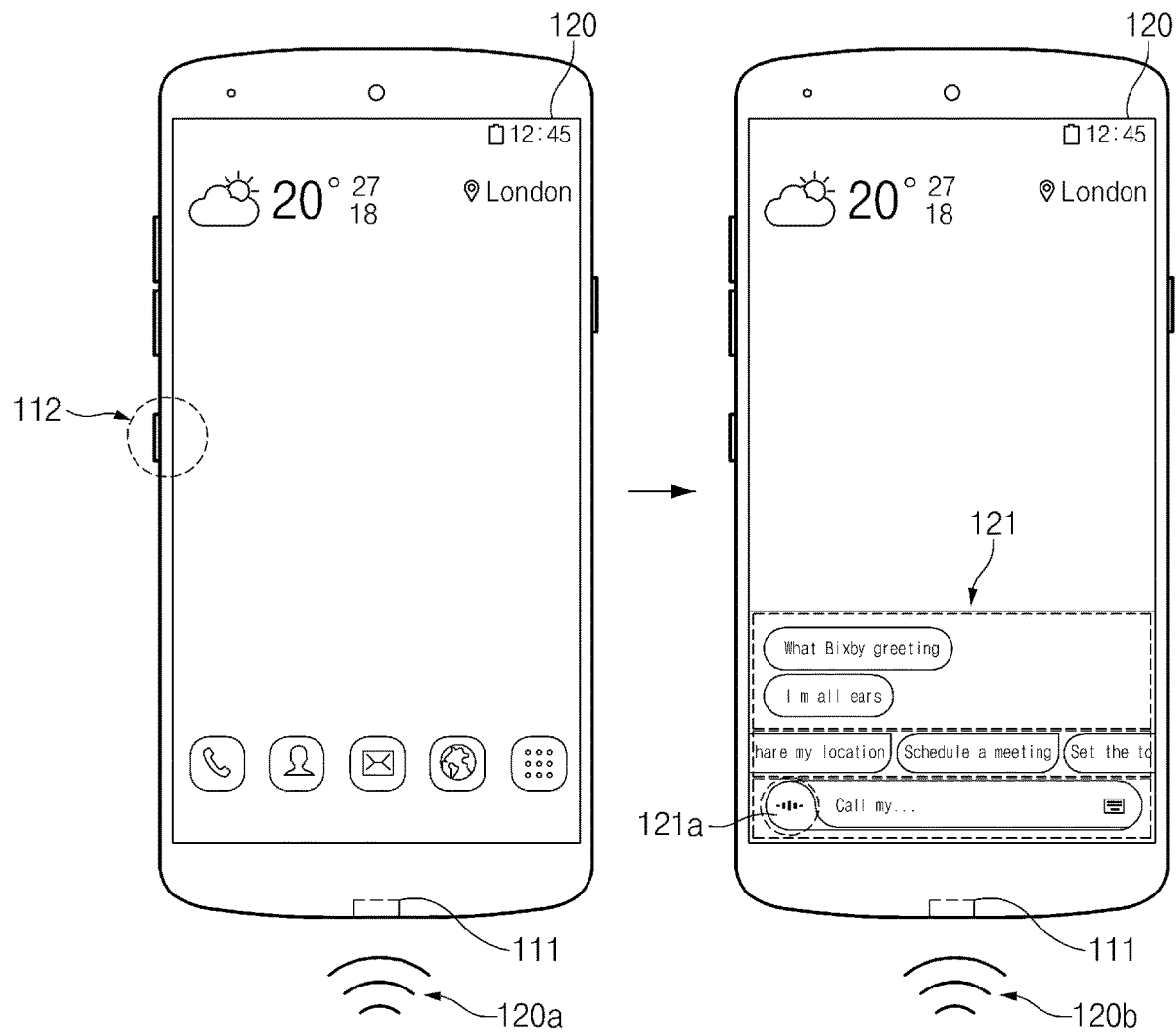
FIG. 3 is a view illustrating that an intelligence app of a user terminal is executed, according to an embodiment of the present disclosure.

FIG. 3 is a view illustrating that an intelligence app of a user terminal is executed, according to an embodiment of the present disclosure.

FIG. 3 illustrates that the user terminal 100 receives a user input to execute an intelligence app (e.g., a speech recognition app) operating in conjunction with the intelligence agent 145.

According to an embodiment, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121*a* to the UI 121 of the intelligence app for the purpose of entering a voice 120*b* in a state where the UI 121 of the intelligence app is displayed in the display 120. For another example, the user may continuously press the hardware key 112 to enter the voice 120*b*.

According to an embodiment, the user terminal 100 may execute the intelligence app for recognizing a voice through a microphone 111. For example, in the case where a specified voice (e.g., wake up!) is entered 120*a* through the microphone 111, the user terminal 100 may display the UI 121 of the intelligence app in the display 120.

Figure 4:
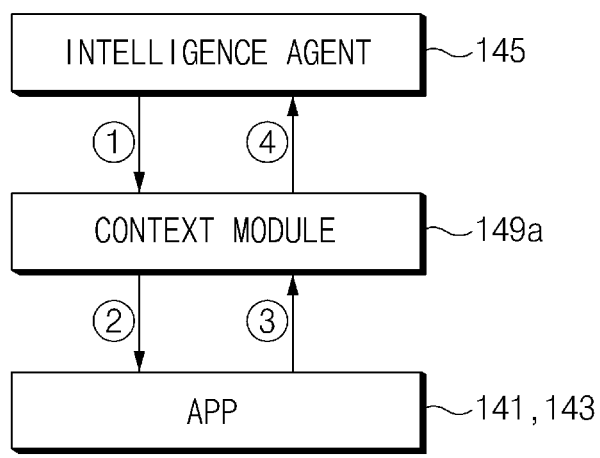
FIG. 4 is a diagram illustrating that a context module of an intelligence service module collects a current state, according to an embodiment of the present disclosure.

FIG. 4 is a diagram illustrating that a context module of an intelligence service module collects a current state, according to an embodiment of the present disclosure.

Referring to FIG. 4, when receiving a context request from the intelligence agent 145 (①), the processor 150 may request context information indicating the current state of apps 141 and 143 through the context module 149a (②). According to an embodiment, the processor 150 may receive the context information from the apps 141 and 143 through the context module 149a (③) and may transmit the context information to the intelligence agent 145 (④).

According to an embodiment, the processor 150 may receive pieces of context information from the apps 141 and 143 through the context module 149a. The context information may be information about the most recently executed apps 141 and 143. For another example, the context information may be information (e.g., in the case where a user watches a picture through a gallery app, information about the corresponding picture) about the current states in the apps 141 and 143.

According to an embodiment, the processor 150 may receive context information indicating a current state of the user terminal 100 from a device platform as well as the apps 141 and 143, through the context module 149a. The context information may include general context information, user context information, or device context information.

The general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. The information about the driving may be verified by sensing Bluetooth connection in a vehicle such that boarding and parking is verified as well as verifying the driving through the motion sensor. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 147 performs. For another example, the device context information may include information about a battery. For example, the information about the battery may be verified through charging and discharging states of the battery. For another example, the device context information may include information about a connected device and a network. For example, the information about the connected device may be verified through a communication interface connected with the device.

Figure 5:
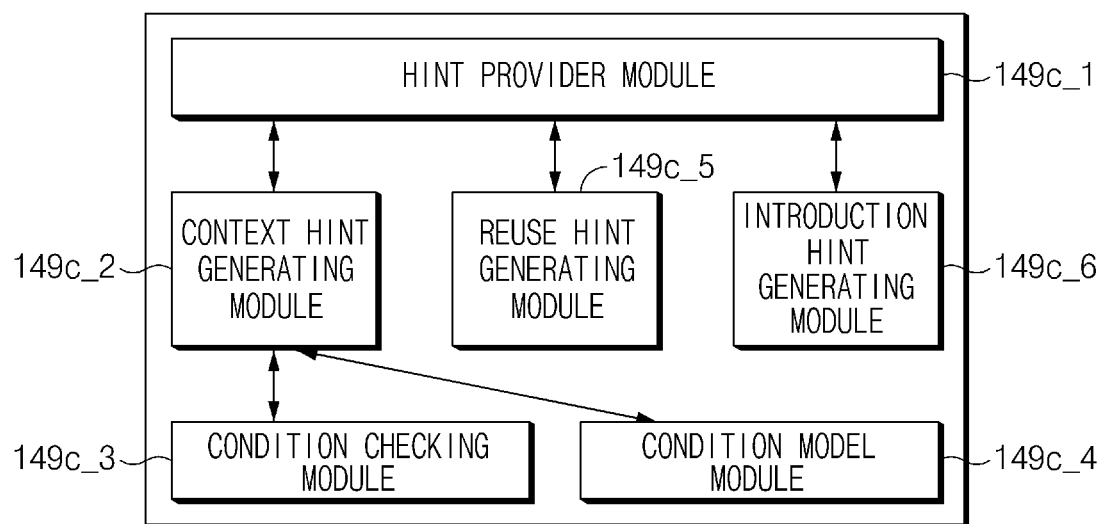
FIG. 5 is a block diagram illustrating a suggestion module of an intelligence service module, according to an embodiment of the present disclosure.

FIG. 5 is a block diagram illustrating a suggestion module of an intelligence service module, according to an embodiment of the present disclosure.

Referring to FIG. 5, the suggestion module 149c may include a hint provider module 149c_1, a context hint generating module 149c_2, a condition checking module 149c_3, a condition model module 149c_4, a reuse hint generating module 149c_5, or an introduction hint generating module 149c_6.

According to an embodiment, the processor 150 may execute the hint provider module 149c_1 to provide a user with a hint. For example, the processor 150 may receive the generated hint from the context hint generating module 149c_2, the reuse hint generating module 149c_5 or the introduction hint generating module 149c_6 through the hint provider module 149c_1, to provide the user with the hint.

According to an embodiment, the processor 150 may execute the condition checking module 149c_3 or the condition model module 149c_4 to generate a hint capable of being recommended depending on the current state. The processor 150 may execute the condition checking module 149c_3 to receive information corresponding to the current state and may execute the condition model module 149c_4 to set a condition model by using the received information. For example, the processor 150 may execute the condition model module 149c_4 to grasp a time, a location, a situation, an app being executed, or the like at a point in time when the hint is provided to the user, and thus may provide the user with a hint, which is likely to be used under the corresponding condition, in descending order of priority.

According to an embodiment, the processor 150 may execute the reuse hint generating module 149c_5 to generate a hint capable of being recommended depending on the usage frequency. For example, the processor 150 may execute the reuse hint generating module 149c_5 to generate the hint based on a usage pattern of the user.

According to an embodiment, the introduction hint generating module 149c_6 may generate a hint for introducing a new function and a function, which is most frequently used by another user, to the user. For example, the hint for introducing the new function may include introduction (e.g., an operating method) associated with the intelligence agent 145.

According to another embodiment, the personal information server 300 may include the context hint generating module 149c_2, the condition checking module 149c_3, the condition model module 149c_4, the reuse hint generating module 149c_5, or the introduction hint generating module 149c_6 of the suggestion module 149c. For example, the processor 150 may receive the hint from the context hint generating module 149c_2, the reuse hint generating module 149c_5, or the introduction hint generating module 149c_6 of the personal information server 300 through the hint provider module 149c_1 of the suggestion module 149c to provide the user with the received hint.

According to an embodiment, the user terminal 100 may provide the hint depending on the following series of processes. For example, when receiving a hint generating request from the intelligence agent 145, the processor 150 may transmit the hint generating request to the context hint generating module 149c_2 through the hint provider module 149c_1. When receiving the hint generating request, the processor 150 may receive information corresponding to the current state from the context module 149a and the persona module 149b through the condition checking module 149c_3. The processor 150 may transmit the received information to the condition model module 149c_4 through the condition checking module 149c_3, and may assign a priority to a hint among hints to be provided to the user, in order of high availability under a condition by using the information through the condition model module 149c_4. The processor 150 may verify the condition through the context hint generating module 149c_2 and may generate a hint corresponding to the current state. The processor 150 may transmit the generated hint to the hint provider module 149c_1 through the context hint generating module 149c_2. The processor 150 may sort the hint depending on the specified rule through the hint provider module 149c_1 and may transmit the hint to the intelligence agent 145.

According to an embodiment, the processor 150 may generate a plurality of context hints through the hint provider module 149c_1 and may assign priorities to the plurality of context hints depending on the specified rule. According to an embodiment, the processor 150 may provide the user with a context hint, the priority of which is high, from among the plurality of context hints at first through the hint provider module 149c_1.

According to an embodiment, the user terminal 100 may propose a hint according to the usage frequency. For example, when receiving a hint generating request from the intelligence agent 145, the processor 150 may transmit the hint generating request to the reuse hint generating module 149c_5 through the hint provider module 149c_1. When receiving the hint generating request, the processor 150 may receive user information from the persona module 149b through the reuse hint generating module 149c_5. For example, the processor 150 may receive a path rule, a parameter included in the path rule, an execution frequency of an app, and information about time and space in which the app is used, which are included in preference information of the user of the persona module 149b through the reuse hint generating module 149c_5. The processor 150 may generate a hint corresponding to the received user information, through the reuse hint generating module 149c_5. The processor 150 may transmit the generated hint to the hint provider module 149c_1 through the reuse hint generating module 149c_5. The processor 150 may sort the hint through the hint provider module 149c_1 and may transmit the hint to the intelligence agent 145.

According to an embodiment, the user terminal 100 may propose a hint associated with a new function. For example, when receiving a hint generating request from the intelligence agent 145, the processor 150 may transmit the hint generating request to the introduction hint generating module 149c_6 through the hint provider module 149c_1. The processor 150 may transmit an introduction hint provision request to the suggestion server 400 and may receive information about a function to be introduced from the suggestion server 400, through the introduction hint generating module 149c_6. For example, the suggestion server 400 may store the information about the function to be introduced, and a hint list associated with the function to be introduced may be updated by a service operator. The processor 150 may transmit the generated hint to the hint provider module 149c_1 through the introduction hint generating module 149c_6. The processor 150 may sort the hint through the hint provider module 149c_1 and may transmit the hint to the intelligence agent 145.

As such, the processor 150 may provide a user with a hint generated by the context hint generating module 149c_2, the reuse hint generating module 149c_5, or the introduction hint generating module 149c_6, through the suggestion module 149c. For example, the processor 150 may display the generated hint in an app operating the intelligence agent 145 through the suggestion module 149c and may receive an input for selecting the hint from the user through the app.

Figure 6:
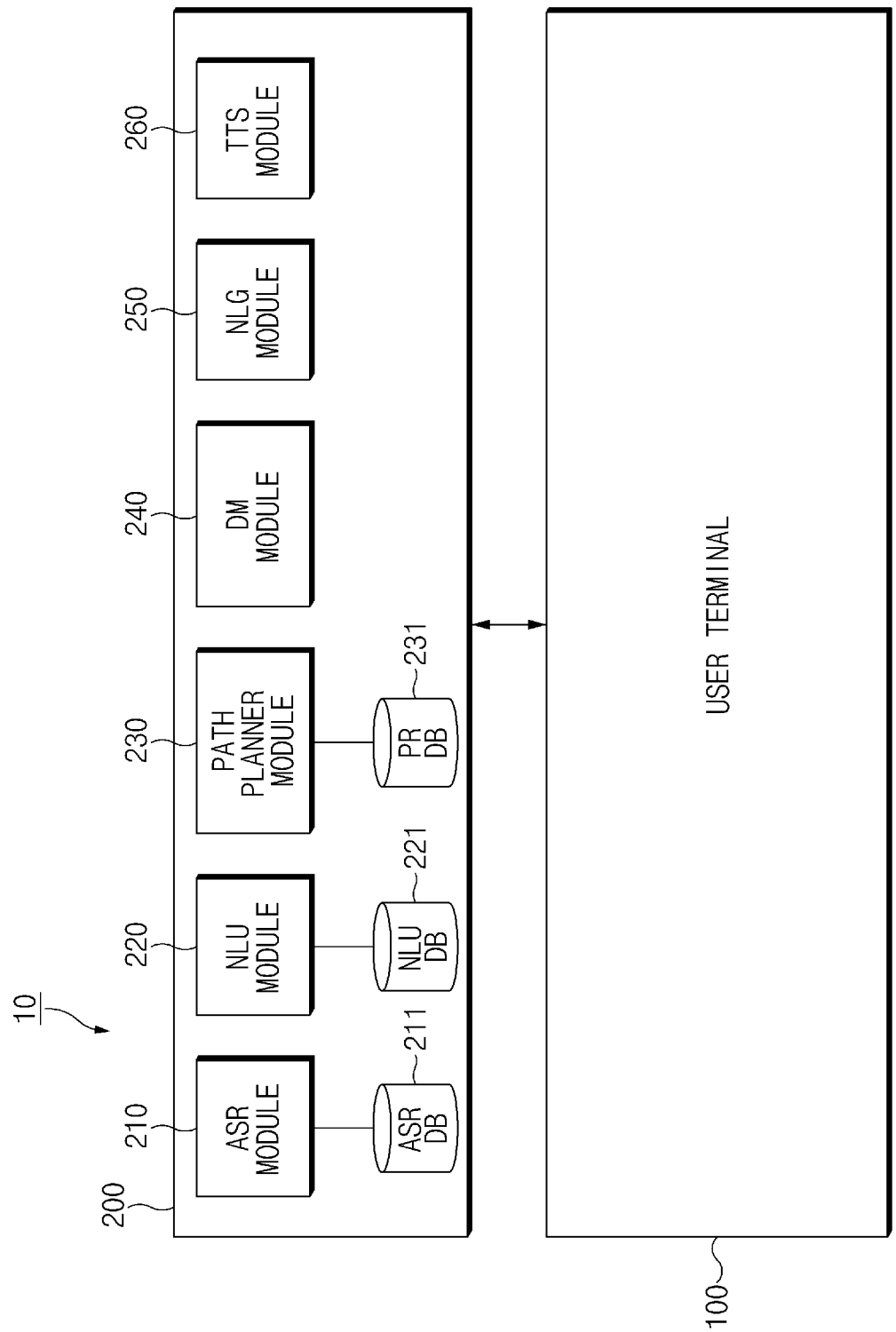
FIG. 6 is a block diagram illustrating an intelligence server of an integrated intelligent system, according to an embodiment of the present disclosure.

FIG. 6 is a block diagram illustrating an intelligence server of an integrated intelligent system, according to an embodiment of the present disclosure.

Referring to FIG. 6, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may convert the user input (e.g., voice data) received from the user terminal 100 to text data. For example, the ASR module 210 may include an utterance recognition module. The utterance recognition module may include an acoustic model and a language model. For example, the acoustic model may include information associated with phonation, and the language model may include unit phoneme information and information about a combination of unit phoneme information. The utterance recognition module may change user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) utilized for the user input to express the intent.

According to an embodiment, the NLU module 220 may determine the intent of the user and parameter by using a matching rule that is divided into a domain, intent, and a parameter (or a slot) utilized to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter utilized to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter utilized to execute the action based on the intent of the user input and the parameter for the purpose of generating one path rule or a plurality of path rules. For example, by using information of the user terminal 100, the NLU module 220 may arrange the app to be executed and the action to be executed in the app depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where a part of actions is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where a part of actions is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may map the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is definite, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 7:
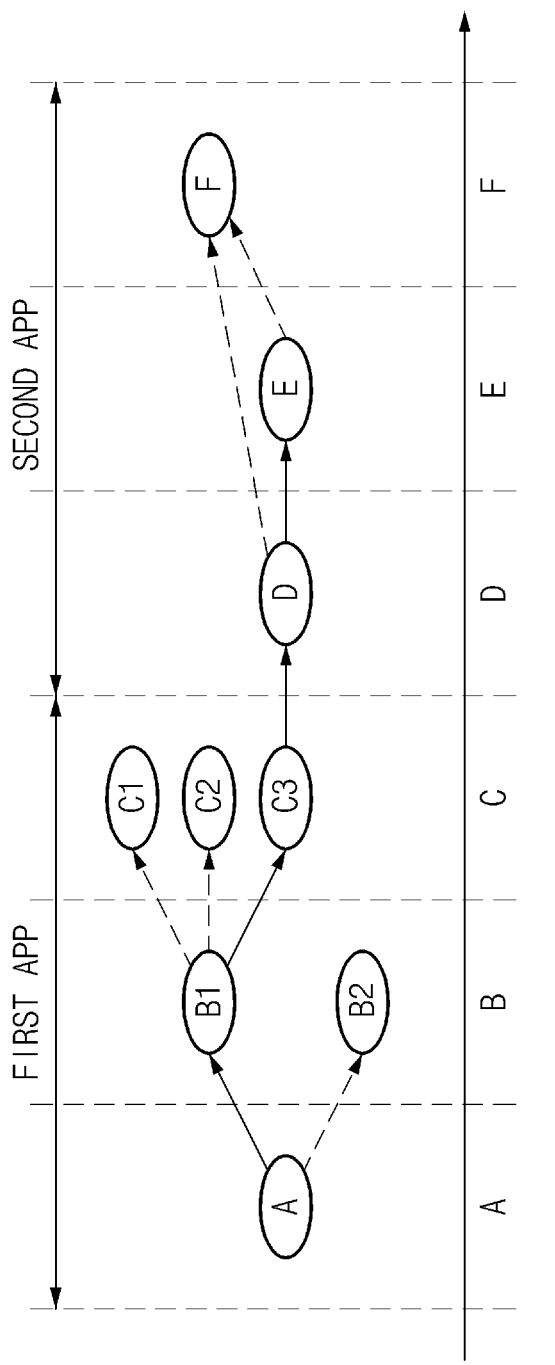
FIG. 7 is a diagram illustrating a path rule generating method of a path planner module, according to an embodiment of the present disclosure.

FIG. 7 is a diagram illustrating a path rule generating method of a path planner module, according to an embodiment of the present disclosure.

Referring to FIG. 7, according to an embodiment, the NLU module 220 may divide the function of an app into any one action (e.g., state A to state F) and may store the divided unit actions in the PR DB 231. For example, the NLU module 220 may store a path rule set including a plurality of path rules (e.g., A-B1-C1, A-B1-C2, A-B1-C3-D-F, and A-B1-C3-D-E-F) divided into the one action, in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter entered to each of the plurality of actions included in each of the plurality of path rules may be sequentially arranged. According to an embodiment, the plurality of path rules implemented in a form of ontology or a graph model may be stored in the PR DB 231.

According to an embodiment, the NLU module 220 may select an optimal path rule (e.g., A-B1-C3-D-F) of the plurality of path rules (e.g., A-B1-C1, A-B1-C2, A-B1-C3-D-F, and A-B1-C3-D-E-F) corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 and may transmit the selected one path rule to the user terminal 100.

According to another embodiment, the NLU module 220 may determine the intent of a user and the parameter corresponding to the user input (e.g., an input for selecting C3) additionally entered by the user terminal 100 and may transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 while executing the first app 141 through the execution manager module 147. The processor 150 may make a request for an additional input to a user by using the information about the insufficient parameter, through the intelligence agent 145. When an additional input is received by a user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145, and may execute the second app 143 depending on the path rule through the execution manager module 147.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, by using the user information. As such, even though the user input in which a portion of information is missed is received by the intelligence server 200, the NLU module 220 may make a request for the missed information to receive an additional input or may determine a path rule corresponding to the user input by using user information.

According to an embodiment, Table 1 attached below may indicate an example form of a path rule associated with a task that a user requests.

TABLE 1

| Path rule ID | State | Parameter |
| --- | --- | --- |
| Gallery_101 | PictureView 25 | NULL |
|  | SearchView 26 | NULL |
|  | SearchViewResult 27 | Location, time |
|  | SearchEmptySelectedView 28 | NULL |
|  | SearchSelectedView 29 | ContentType, selectall |
|  | CrossShare 30 | anaphora |

Referring to Table 1, a path rule that is generated or selected by the intelligence server 200 depending on user utterance (e.g., "please share a picture") may include at least one state 25, 26, 27, 28, 29 or 30. For example, the at least one state (e.g., one operating state of a terminal) may correspond to at least one of the picture application execution PicturesView state 25, the picture search function execution SearchView state 26, the search result display screen output SearchViewResult state 27, the search result display screen output, in which a picture is non-selected, SearchEmptySelectedView state 28, the search result display screen output, in which at least one picture is selected, SearchSelectedView state 29, or the share application selection screen output CrossShare state 30.

In an embodiment, parameter information of the path rule may correspond to at least one state. For example, the selected at least one picture may be included in the SearchSelectedView state 29.

The task (e.g., "please share a picture!") that the user requests may be performed depending on the execution result of the path rule including the sequence of the states 25, 26, 27, 28, and 29.

Figure 8:
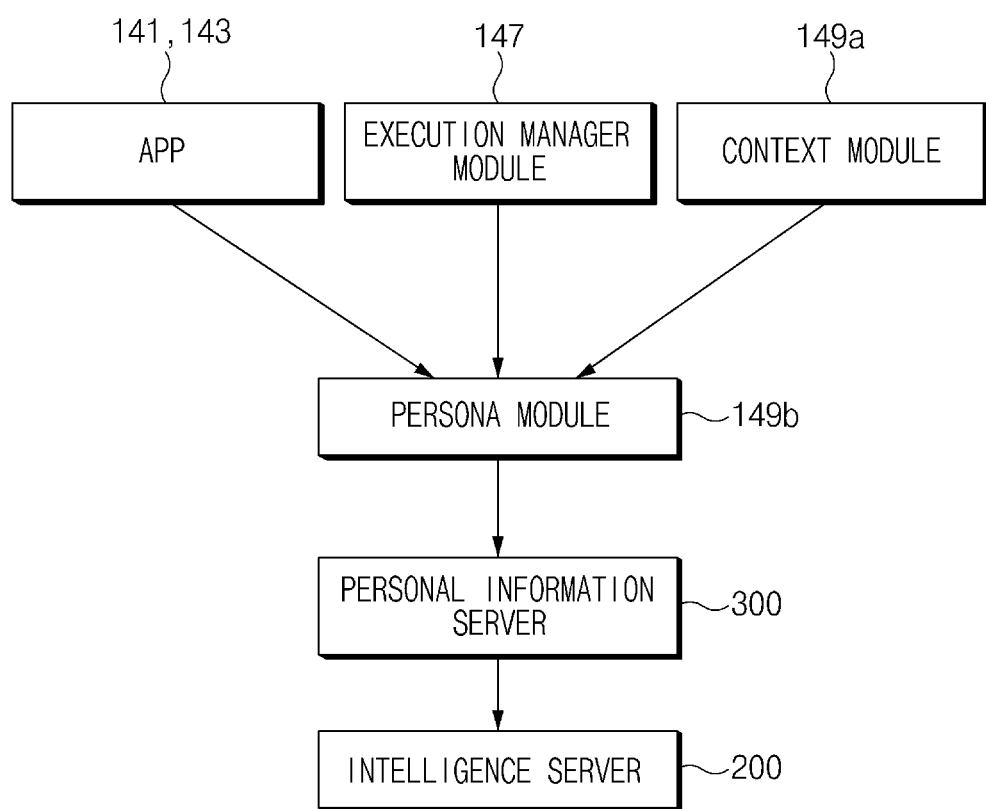
FIG. 8 is a diagram illustrating that a persona module of an intelligence service module manages information of a user, according to an embodiment of the present disclosure.

FIG. 8 is a diagram illustrating that a persona module of an intelligence service module manages information of a user, according to an embodiment of the present disclosure.

Referring to FIG. 8, the processor 150 may receive information of the user terminal 100 from the apps 141 and 143, the execution manager module 147, or the context module 149a through the persona module 149b. The processor 150 may store information about the result obtained by executing the actions 141b and 143b of an app in an action log database through the apps 141 and 143 and the execution manager module 147. The processor 150 may store information about a current state of the user terminal 100 in a context database through the context module 149a. The processor 150 may receive the stored information from the action log database or the context database through the persona module 149b. For example, data stored in the action log database and the context database may be analyzed by an analysis engine and may be transmitted to the persona module 149b.

According to an embodiment, the processor 150 may transmit information received from the apps 141 and 143, the execution manager module 147, or the context module 149a to the suggestion module 149c through the persona module 149b. For example, the processor 150 may transmit the data stored in the action log database or the context database to the suggestion module 149c through the persona module 149b.

According to an embodiment, the processor 150 may transmit information received from the apps 141 and 143, the execution manager module 147, or the context module 149a to the personal information server 300 through the persona module 149b. For example, the processor 150 may periodically transmit the data, which is accumulated and stored in the action log database or the context database, to the personal information server 300 through the persona module 149b.

According to an embodiment, the processor 150 may transmit the data stored in the action log database or the context database to the suggestion module 149c through the persona module 149b. The user information generated through the persona module 149b may be stored in a persona database. The persona module 149b may periodically transmit the user information stored in the persona database to the personal information server 300. According to an embodiment, the information transmitted to the personal information server 300 through the persona module 149b may be stored in the persona database. The personal information server 300 may infer user information utilized to generate a path rule of the intelligence server 200 by using the information stored in the persona database.

According to an embodiment, the user information inferred by using the information transmitted through the persona module 149b may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be inferred by comparing log information with a life event model and may be reinforced by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred by using the activity area information (e.g., information about a house and a work place). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 9:
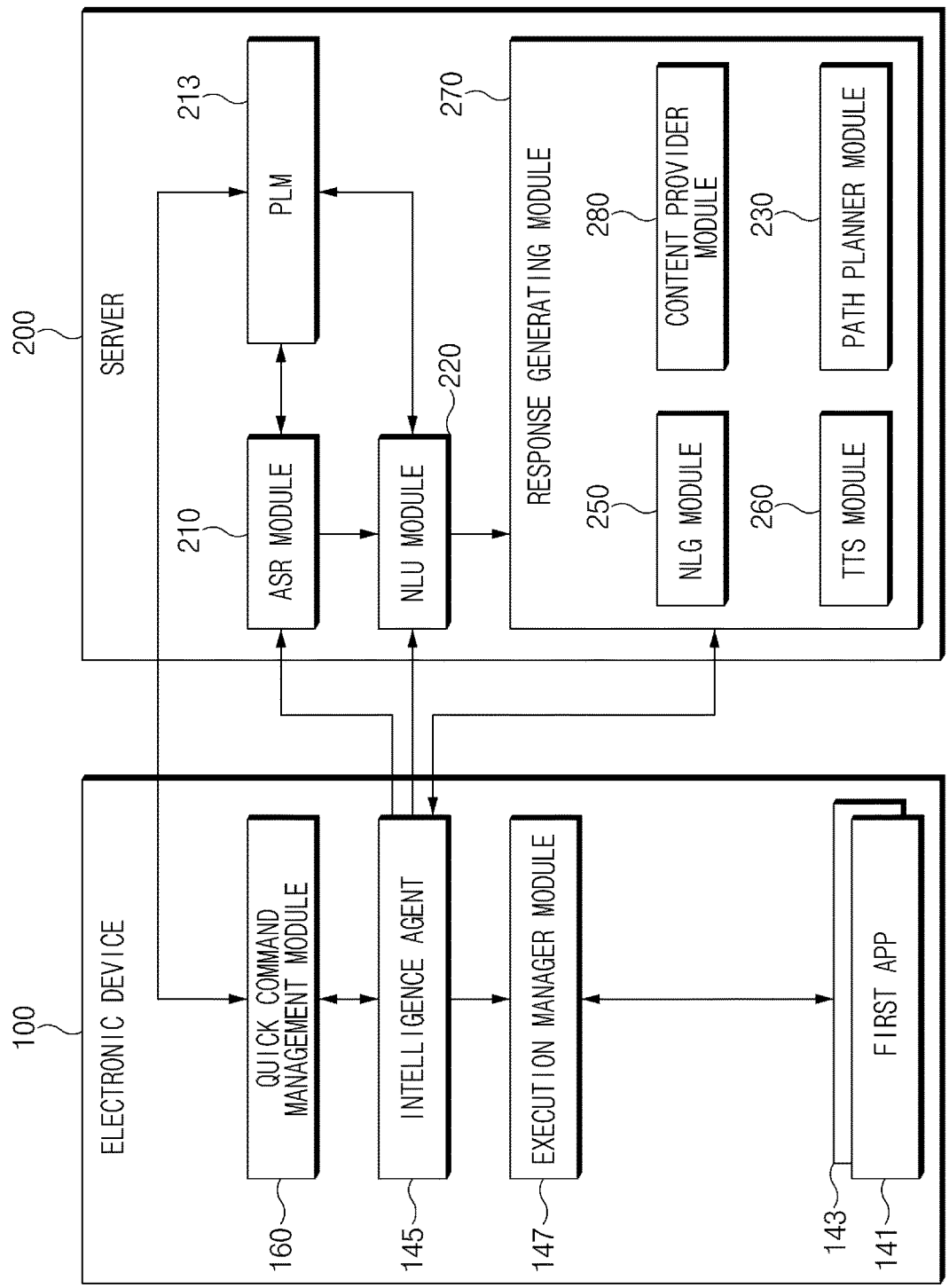
FIG. 9 is a block diagram of a system associated with voice data processing, according to an embodiment of the present disclosure.

FIG. 9 is a block diagram of a system associated with voice data processing, according to an embodiment of the present disclosure. The system (the electronic device 100 and the server 200) illustrated in FIG. 9 may be a touch UI-based text/voice integrated intelligence interface and may process a voice, an multi-modal input, or the like as well as a touch. FIG. 9 illustrates a structure diagram associated with a method in which the system processes a voice input when a user enters a voice through an utterance. In FIG. 9, description about elements given in the above-described drawings will be skipped.

Referring to FIG. 9, when the user speaks, the user terminal (or electronic device) 100 may receive a voice input according to the utterance of the user. In addition, the user terminal 100 may transmit voice data corresponding to the voice input to the intelligence server 200. According to an embodiment, the processor 150 of the user terminal 100 may execute the intelligence agent 145 and may transmit the voice data corresponding to the voice input to the intelligence server 200 through the intelligence agent 145.

The intelligence server 200 receiving the voice data may convert the voice data to text data through the ASR module 210. For example, the ASR module 210 may convert voice data into text data by using an acoustic model including information associated with phonation and a language model including unit phoneme information, through the utterance recognition module. The converted text data may be transmitted to the NLU module 220.

The NLU module 220 may perform grammatical analysis or semantic analysis associated with the text data to determine user intent. According to an embodiment, the NLU module 220 may determine the user intent by using the NLU DB 221 storing the linguistic features for grasping the intent of the user utterance. According to another embodiment, the NLU module 220 may determine the user's intent by using a PLM 213. For example, the NLU module 220 may determine the user intent by using the personalized information (e.g., a contact list or a music list). For example, the PLM 213 may be stored in the NLU DB 221. According to an embodiment, the ASR module 210 as well as the NLU module 220 may recognize the voice of the user with reference to the PLM 213 stored in the NLU DB 221.

A response generating module 270 may generate a response to be transmitted to the user terminal 100, depending on the content (e.g., the intent of the user) of the text data. According to an embodiment, the path planner module 230 of the response generating module 270 may generate the one path rule or the plurality of path rules by using the user intent and the parameter. For example, the path planner module 230 may determine the app to be executed and the action to be executed in the app based on the user intent and the parameter and may generate the one path rule or the plurality of path rules. According to an embodiment, in the case where a content provider module 280 of the response generating module 270 executes an action based on the intent and the parameter grasped by the NLU module 220, the content provider module 280 may generate the result obtained by performing a task corresponding to the voice input. According to an embodiment, the response generating module 270 may transmit the result generated by the content provider module 280, to the user terminal 100 as a response to the voice input. According to an embodiment, the NLG module 250 may change specified information to a text form. Information changed to the text form may be a form of a natural language utterance. For example, the specified information may be information about an additional input, information for guiding the completion of an action corresponding to the voice input, or information for guiding the additional input of the user (e.g., voice input). The information changed to the text form may be displayed in the display 120 of the user terminal after being transmitted to the user terminal 100 or may be changed to a voice form after being transmitted to the TTS module 260. According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130 of the user terminal 100.

The user terminal 100 receiving a response from the intelligence server 200 through the intelligence agent 145 may transmit the response to the execution manager module 147. In this case, the user terminal 100 may perform the action of an app (e.g., the first app 141 or the second app 143) depending on the response through the execution manager module 147.

When the operation of the app is completed, the intelligence agent 145 may transmit a completion message of the action to the NLG module 250 of the intelligence server 200. The NLG module 250 may generate a response, which corresponds to the completion message, in a text data format. Furthermore, the NLG module 250 may transmit the response of the text data format to the TTS module 260. The TTS module 260 may change the response of the text data format to the response of a voice data format. The response generating module 270 may transmit the responses of the text data format and the voice data format to the intelligence agent 145. In this case, the intelligence agent 145 may output the response through the display 120 and the speaker 130.

According to an embodiment, a quick command management module 160 of the user terminal 100 may determine whether the voice input by the user's utterance includes a quick command. According to an embodiment, the processor 150 of the user terminal 100 may transmit the voice data corresponding to the voice input to the intelligence server 200 through the intelligence agent 145; and the ASR module 210 of the intelligence server 200 may convert the voice data to text data. Moreover, the intelligence agent 145 may receive the converted text data from the intelligence server 200 and may forward the converted text data to the quick command management module 160. The quick command management module 160 may determine whether the text data includes a quick command. The quick command (or shortened command) may include the mapped information such that at least one voice command requesting the execution of a task is capable of being performed by using one specified (or selected) expression (e.g., word, phrase, or sentence). For example, at least one voice command may be mapped to the expression assigned (or selected) to the quick command, and the mapped information may be stored and managed in the database included in the quick command management module 160. In an embodiment, the quick command management module 160 may synchronize mapping information about the quick command with the PLM 213 of the intelligence server 200 in real time or periodically.

In the case where the text data includes the quick command, that is, in the case where a specified expression mapped to the text data is present in the database, the quick command management module 160 may transmit information (e.g., an identifier 1030 of the path rule or an utterance content 1040 of the user) associated with at least one task to be performed through the quick command, to the intelligence server 200. In this case, the intelligence server 200 may determine information (e.g., path rule) about the sequence of states of the user terminal 100 associated with the execution of the at least one task, by using the information (e.g., the identifier 1030 of the path rule or the utterance content 1040 of the user) associated with the at least one task through the NLU module 220 or the path planner module 230. In addition, the intelligence server 200 may transmit the determined information about the sequence of the states to the user terminal 100, and the user terminal 100 may perform the at least one task depending on the information.

In an embodiment, the quick command management module 160 may determine a path rule associated with the execution of the at least one task among at least one or more path rules stored in the user terminal 100, by using at least one or more pieces of task information (e.g., the identifier 1030 of the path rule or the utterance content 1040 of the user) associated with the quick command. The user terminal 100 may perform a task depending on the determined path rule. For example, the user terminal 100 may perform the task based on information 1060 defining the state of a device according to the path rule described in FIG. 10.

According to an embodiment, in the case where there are a plurality of tasks to be performed through the quick command, the quick command management module 160 may determine the relationship between the plurality of tasks. For example, in the case where whether a second task is performed depending on the execution result of a first task among a plurality of tasks defined as the quick command is determined, or in the case where the execution result of the second task is different depending on the execution result of a first task among a plurality of tasks defined as the quick command is determined, the quick command management module 160 may determine that the first task and the second task are interconnected with each other.

According to an embodiment, in the case where there are a plurality of tasks to be performed through the quick command and the relationship between the plurality of tasks is present, the quick command management module 160 may sequentially perform the plurality of tasks depending on the specified order. For another example, in the case where there are a plurality of tasks to be performed through the quick command and the relationship between the plurality of tasks is absent, the quick command management module 160 may perform the plurality of tasks in parallel. For example, while performing the first task, the quick command management module 160 may perform the second task together.

According to an embodiment, the quick command management module 160 may determine the type of a task and may determine whether to process information (e.g., the identifier 1030 of the path rule or the utterance content 1040 of the user) associated with the task depending on the type of the task in the user terminal 100, whether to transmit the information to the intelligence server 200, or whether to transmit the information to another server. For example, in the case where the task is capable of being performed through the path rule, the quick command management module 160 may transmit information (e.g., the identifier 1030 of the path rule or the utterance content 1040 of the user) associated with the task to the intelligence server 200. Alternatively, the quick command management module 160 may determine a path rule associated with the execution of the task among at least one or more path rules (or path rule set) stored in the user terminal 100 by using information associated with the task, without transmitting information (e.g., the identifier 1030 of the path rule or the utterance content 1040 of the user) associated with the task to the intelligence server 200; and then the quick command management module 160 may perform the task depending on the determined path rule. For example, the user terminal 100 may perform the task based on the information 1060 defining the state of a device according to the path rule described in FIG. 10. For another example, in the case where the task is performed in the chatbot format or the open QA format, the quick command management module 160 may transmit information (e.g., the utterance content 1040 of the user) associated with the task to a chatbot server or an open QA server. The chatbot or the open QA may mean a method of generating a response to the utterance of the user to provide the response in a widget form. In this case, the response may be provided after being generated in the user terminal 100; a service provider serving the chatbot or the open QA may generate the response and the user terminal 100 may receive the response from the service provider to provide the response; or the service provider may generate and provide both the response or a result screen.

As described above, according to various embodiments, an electronic device (e.g., the user terminal 100) may include a housing, a touchscreen display (e.g., the display 120) positioned inside the housing and exposed through a first portion of the housing, a microphone (e.g., the microphone 111) positioned inside the housing and exposed through a second portion of the housing, at least one speaker (e.g., the speaker 130) positioned inside the housing and exposed through a third portion of the housing, a wireless communication circuit positioned inside the housing, a processor (e.g., the processor 150) positioned inside the housing and electrically connected to the touchscreen display, the microphone, the at least one speaker, and the wireless communication circuit, and at least one memory (e.g., the memory 140) positioned in the housing and electrically connected with the processor. The at least one memory may store instructions that, when executed, cause the processor to receive a first user utterance through the microphone, transmit first data associated with the first user utterance to an external server (e.g., the intelligence server 200) including automatic speech recognition (ASR), through the wireless communication circuit, receive first text data generated from the ASR through the wireless communication circuit, determine whether the first text data includes at least one selected word, phrase, or sentence, when the first text data includes the at least one selected word, phrase, or sentence, select a plurality of tasks mapped to the at least one selected word, phrase, or sentence, and execute the plurality of tasks sequentially and/or in parallel, by using at least a portion of the electronic device. The first user utterance does not include an explicit request for executing all of the plurality of tasks.

According to various embodiments, the plurality of tasks may include a first task and a second task. And the at least one memory may store first information associated with the first task and including a first identifier, and second information associated with the second task and including a second identifier.

According to various embodiments, the at least one memory may include information mapped to the at least one selected word, phrase, or sentence. And the mapped information may include information about the plurality of tasks.

According to various embodiments, the information about the plurality of tasks may include at least one of types of the plurality of tasks, information about a sequence of states of the electronic device for executing the plurality of tasks, a voice command for requesting the execution of the plurality of tasks, feedback information according to the execution of the plurality of tasks, or information indicating whether to be a task to be executed last among the plurality of tasks.

According to various embodiments, the at least one memory may further store instructions that, when executed, cause the processor to determine whether to process at least part of information about the plurality of tasks in the electronic device or to transmit the at least part of information about the plurality of tasks to the external server or another external server, depending on the types of the plurality of tasks.

As described above, according to various embodiments, an electronic device (e.g., the user terminal 100) may include a microphone (e.g., the microphone 111), a communication circuit, a processor (e.g., the processor 150) electrically connected to the microphone and the communication circuit, and a memory (e.g., the memory 140) electrically connected to the processor and configured to store a first expression mapped to first information about a plurality of first tasks. The memory may store instructions that, when executed, cause the processor to receive a first voice input of a user through the microphone, transmit voice data corresponding to the first voice input to an external server capable of performing automatic speech recognition (ASR), through the communication circuit, receive first text data generated as a result of the ASR associated with the voice data, from the external server through the communication circuit, search for the first expression corresponding to the first text data in the memory, when the first expression corresponding to the first text data is present in the memory, transmit the first information about the first tasks mapped to the first expression to the external server through the communication circuit, receive second information about a sequence of states of the electronic device for executing the first tasks determined based on the first information, from the external server through the communication circuit, and execute the first tasks based on the second information. The first expression may include a specified word, a specified phrase, or a specified sentence so as to be different from first voice commands for explicitly requesting the execution of the first tasks.

According to various embodiments, the first information about the first tasks may include at least one types of the first tasks, identification information of the second information, the first voice commands, parameter information included in the second information, feedback information according to the execution of the first tasks, the second information, or third information indicating whether to be a task to be executed last among the first tasks.

According to various embodiments, the memory may further store instructions that, when executed, cause the processor to map a second expression to third information about a plurality of second tasks at least partly different from the first tasks to store the mapped result in the memory based on at least one of recommendation information, utterance history information of the user, at least one second voice command executable by the electronic device and stored in advance in the memory, the first expression, or a second voice input of the user received through the microphone. And the second expression may include a specified word, a specified phrase, or a specified sentence so as to be different from third voice commands for explicitly requesting execution of the second tasks.

According to various embodiments, the memory may further store instructions that, when executed, cause the processor to, in the mapping of the second expression to the third information about the second tasks based on the second voice input, when a portion of fourth information about a sequence of states of the electronic device for executing the second tasks is not present in second text data corresponding to the second voice input, provide an interface that allows the user to enter fifth information corresponding to the portion of the fourth information.

According to various embodiments, the electronic device may further include at least one of a speaker (e.g., the speaker 130) or a touchscreen display (e.g., the display 120). The interface may include an object that induces the user to enter a third voice input corresponding to the fifth information through the microphone. And the object may be output through the at least one of the speaker or the display.

According to various embodiments, the electronic device may further include a touchscreen display (e.g., the display 120). The interface may include an object that induces the user to enter the fifth information through the touchscreen display. And the object may be output through the touchscreen display.

According to various embodiments, the object may include at least one of an object for providing a hint associated with the fifth information or an object for displaying a list capable of selecting the fifth information.

According to various embodiments, the memory may further store instructions that, when executed, cause the processor to provide an interface for editing the first expression and the first information about the first tasks mapped to the first expression.

As described above, according to various embodiments, an electronic device (e.g., the user terminal 100) may include a microphone (e.g., the microphone 111), a communication circuit, a processor (e.g., the processor 150) electrically connected to the microphone and the communication circuit, and a memory (e.g., the memory 140) electrically connected to the processor and storing an expression mapped to information about a plurality of tasks. The memory may store instructions that, when executed, allow the processor to receive the voice input of the user through the microphone, to transmit voice data corresponding to the voice input to an external server capable of performing ASR, through the communication circuit, to receive the text data generated as the result of the ASR associated with the voice data, from the external server through the communication circuit, to search for the expression corresponding to the text data in the memory, to perform the plurality of tasks by using information about the plurality of tasks when the expression corresponding to the text data is present. The information about the plurality of tasks includes information about a sequence of states of the electronic device for performing the plurality of tasks. The expression may include specified words, phrases, or sentences that are different from voice commands for explicitly requesting the execution of the plurality of tasks.

Figure 10:
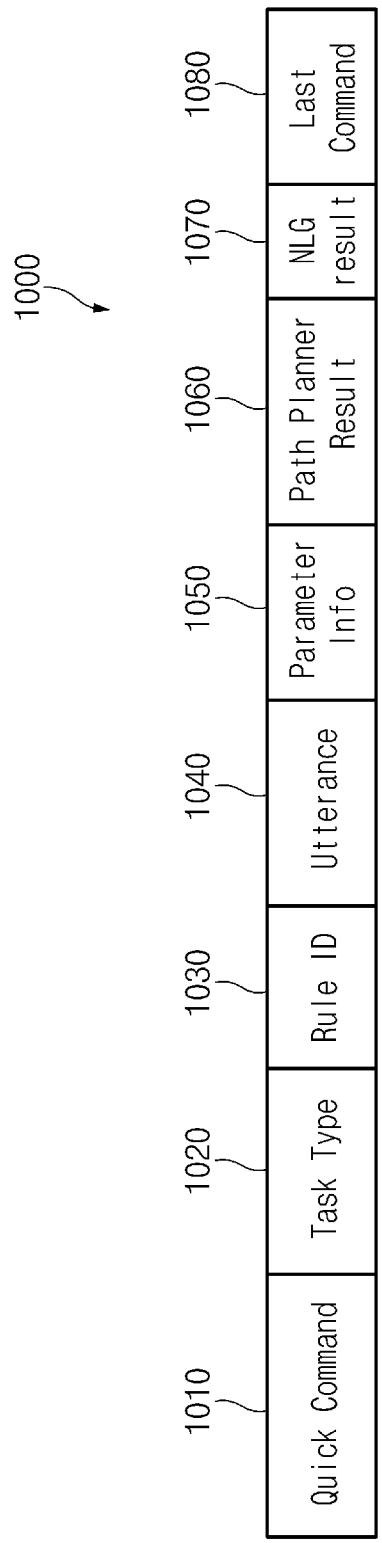
FIG. 10 is a diagram illustrating the data structure of a quick command, according to an embodiment of the present disclosure.

FIG. 10 is a diagram illustrating the data structure of a quick command, according to an embodiment of the present disclosure.

Referring to FIG. 10, data 1000 set to a quick command may include an expression 1010 assigned to the quick command, a task type 1020, the identifier 1030 of a path rule (i.e., the "Rule ID"), the utterance content 1040 of a user (e.g., the actual voice command that was recorded), parameter information 1050, the information 1060 defining the state of a device according to a path rule, feedback information 1070 (e.g., the "NLG result" or result of natural language generation), and/or information 1080 indicating whether a task is the last task.

For example, the expression assigned as the quick command 1010 may include a word, a phrase, or a sentence mapped as a voice command requesting execution of a task. For example, in the case where the task includes a function to transmit a text message to a specific person (e.g., Mom), a word (e.g., "Mom"), a phrase, or a sentence, may be mapped to a voice command (e.g., send a text to "Mom") which when detected requests the execution of the function may be the specified expression 1010.

The task type 1020 may be used as information utilized in determining whether a task to be performed is capable of being performed by the path rule, or whether the task to be performed is capable of being performed via a chatbot format, or an open QA format. The path rule may indicate a successive series of functions, sub-functions, commands, etc. The 'chatbot' format may indicate an artificial intelligence interacting with the user by simulating intelligent conversation. Lastly, the 'open QA' format may indicate a series of pre-specified questions designed to ascertain the user's intention and execution the corresponding function(s).

The identifier 1030 of the path rule may include the identifier of a path rule for performing the task, corresponding to information set in the case where the task type 1020 corresponds to the path rule. In an embodiment, version information about a path rule may be further included in the identifier 1030 of the path rule.

The utterance content 1040 of the user may include a voice command for requesting the execution of a task. For example, in the case where the task includes a function to send a text message to a specific person, the utterance content 1040 of the user may include utterance content such as "send a text to" followed by indication of a specific person, such as a stored contact name or a contact nickname.

The parameter information 1050 may include information about a parameter needed to perform the path rule.

The information 1060 that defines the state of the device according to the path rule may include the information set in the JSON specification (i.e., JavaScript Object Notation) by defining a state capable of being actually operated in the app to perform the path rule. For example, in the case where the path rule is selected (or generated) to perform a task to delete all alarms set on the device, the information 1060 that defines the state of the device according to the path rule may include information such as a first state (executing a clock app), a second state (executing a notification list screen), and a third state (deleting all alarms) of a device.

The feedback information 1070 may include information indicating feedback to be provided to the user after the quick command is performed.

The "last command" 1080 indicates whether a task is the last task, and may include information indicating whether at least one task mapped to the expression 1010 assigned to a quick command is the task to be last performed. For example, in the case where there are 'n' tasks mapped to the expression 1010 assigned to the quick command, the quick command data 1000 corresponding to the task to be executed n-th may include information indicating that the quick command data 1000 is the last, in the information 1080 indicating whether a task is the last task. In an embodiment, the information 1080 indicating whether a task is the last task may further include execution order information of the corresponding task. For example, in the case where there are 'n' tasks mapped to the expression 1010 assigned to the quick command and in the case where the execution order of the corresponding task is 'm-th', the information 1080 indicating whether a task is the last task may include the total number of tasks to be performed, such as 'm/n', and the execution order information of the corresponding task.

According to an embodiment, a plurality of tasks may be performed depending on the expression 1010 assigned to the quick command; in this case, the quick command data 1000 may be generated (or set) to correspond to the number of tasks. For example, in the case where there are three tasks to be performed when the quick command, in which the specified expression 1010 is "Mom", is entered, the three pieces of quick command data 1000 may be generated (or set).

Figure 11A:
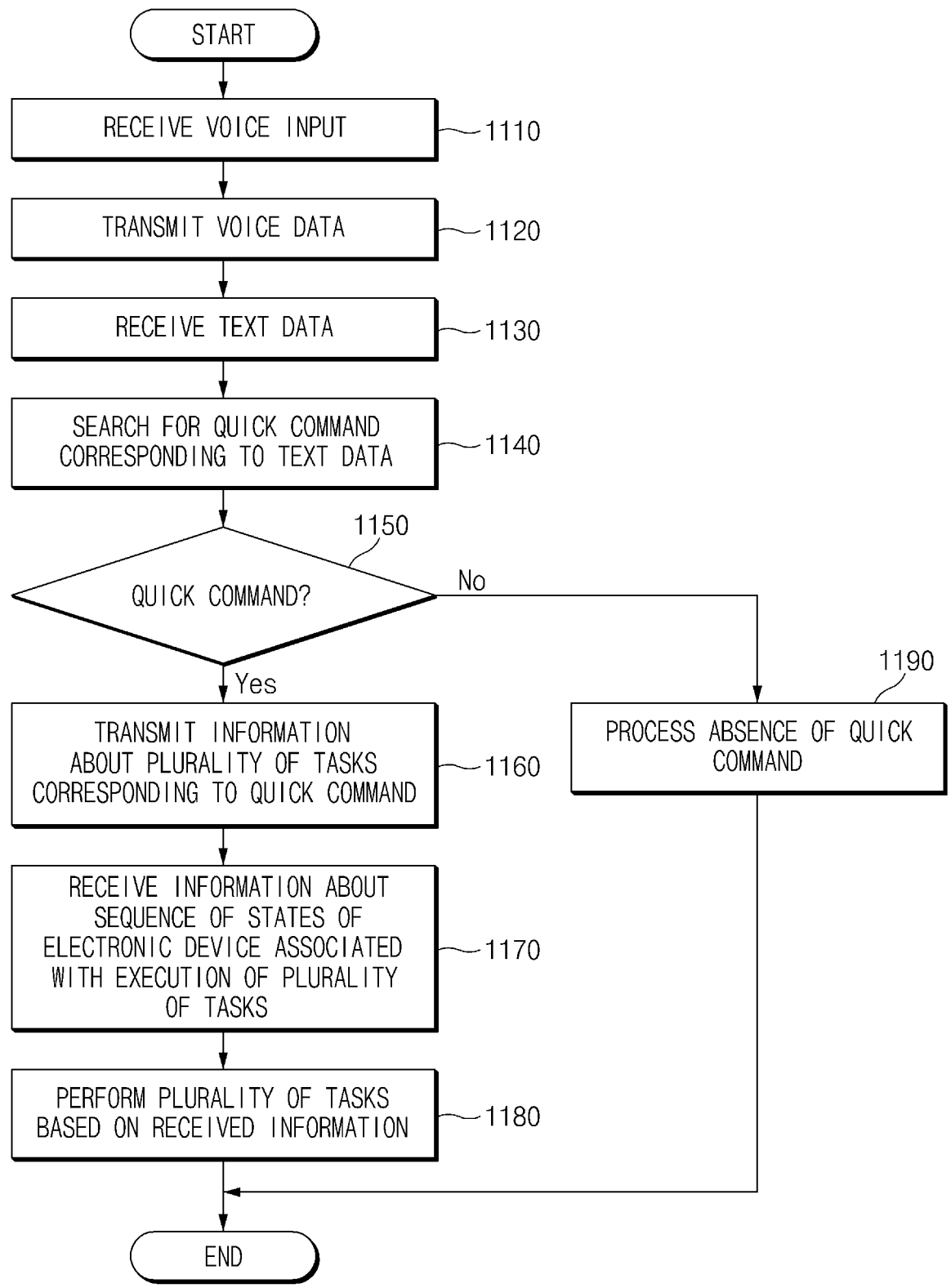
FIG. 11A is a flowchart illustrating an operating method of an electronic device associated with voice data processing, according to an embodiment of the present disclosure.

FIG. 11A is a flowchart illustrating an operating method of an electronic device associated with voice data processing, according to an embodiment of the present disclosure.

Referring to FIG. 11A, in operation 1110, an electronic device (e.g., the user terminal 100) may receive a voice input. According to an embodiment, the user terminal 100 may receive a voice input in the form of an utterance of a user, recorded through the microphone 111.

In operation 1120, the electronic device (e.g., the intelligence agent 145) may transmit voice data corresponding to the received voice input to a server (e.g., the intelligence server 200). In this case, the server may convert the received voice data to text data. According to an embodiment, the ASR module 210 of the intelligence server 200 may convert the voice data, which is received from the user terminal 100, to text data. For example, the ASR module 210 may convert voice data into text data by using information about the phonation and information about a voice to extract the text equivalent from the voice data. In addition, after conversion, the server may transmit the converted text data to the electronic device.

In operation 1130, the electronic device (e.g., the intelligence agent 145) may receive the converted text data from the server. Furthermore, the intelligence agent 145 may transmit the received text data to the quick command management module 160.

In operation 1140, the electronic device (e.g., the quick command management module 160) may search for a quick command corresponding to the received text data. For example, the quick command management module 160 may determine whether the text data includes an expression 1010 that has been pre-assigned to a particular quick command. In such a case, the quick command management module 160 may search for the corresponding quick command in a database storing information indicating the correlation. For example, the expression 1010 may be mapped to the quick command in the database.

Depending on the search result of the quick command, in operation 1150, the electronic device (e.g., the quick command management module 160) may determine whether the voice input indicates and/or requests a function via input of a quick command. For example, in the case where the quick command corresponding to the text data is present in the database, the quick command management module 160 may determine that the voice input includes the quick command.

In the case where the voice input is the quick command, in operation 1160, the electronic device (e.g., the intelligence agent 145) may transmit information regarding a plurality of tasks corresponding to the quick command, to the server. In an embodiment, when a plurality of tasks corresponding to the quick command are present, the quick command management module 160 of the user terminal 100 may transmit the identifier 1030 of a path rule for performing the plurality of tasks and/or the utterance content 1040 of the user, to the intelligence server 200 through the intelligence agent 145. According to an embodiment, the quick command management module 160 may verify the information about the plurality of tasks to transmit the information to the intelligence agent 145.

In an embodiment, the quick command management module 160 of the user terminal 100 may determine a type of each task of the plurality of tasks, and may determine whether to process information (e.g., the identifier 1030 of the path rule or the utterance content 1040 of the user) associated with the task depending on the identified type of each task in the user terminal 100, whether to transmit the information to the intelligence server 200, or whether to transmit the information to another server. For example, in the case where the task is capable of being performed through the path rule, the quick command management module 160 may transmit the identifier 1030 of the path rule or the utterance content 1040 of the user to the intelligence server 200. For another example, the quick command management module 160 may determine a path rule associated with the execution of the task among at least one or more path rules (or path rule set) stored in the user terminal 100 by using information (e.g., the identifier 1030 of the path rule or the utterance content 1040 of the user) associated with the task and may perform the task depending on the determined path rule. For example, the user terminal 100 may perform the task based on the information 1060 defining the state of a device according to the path rule. For another example, in the case where the task is performed in the chatbot format or the open QA format, the quick command management module 160 may transmit the utterance content 1040 of the user to a chatbot server or an open QA server.

When receiving the identifier 1030 of path rules for performing the plurality of tasks or the utterance content 1040 of the user, the intelligence server 200 may determine pieces of information (e.g., path rules) about the sequence of states of the user terminal 100 associated with the execution of the plurality of tasks by using the identifier 1030 of the path rules or the utterance content 1040 of the user through the NLU module 220 or the path planner module 230. Furthermore, the intelligence server 200 may transmit the determined pieces of information about the sequence of states to the user terminal 100.

In operation 1170, the electronic device (e.g., the intelligence agent 145) may receive information identifying the sequence of states of the electronic device associated with execution of the plurality of tasks. According to an embodiment, the user terminal 100 may thus receive path rules for performing the plurality of tasks from the intelligence server 200 through the intelligence agent 145.

According to an embodiment, the electronic device (e.g., the quick command management module 160) may search for the path rules for performing the plurality of tasks among at least one or more path rules (or path rule set) stored in the electronic device.

In operation 1180, the electronic device (e.g., the execution manager module 147) may perform the plurality of tasks based on the received information in accordance with the path rules. According to an embodiment, the intelligence agent 145 of the user terminal 100 may transmit the received path rules to the execution manager module 147, and the execution manager module 147 may execute one or more apps according to the path rules.

In the case where the voice input does not include or indicate a quick command, in operation 1190, the electronic device may execute processes appropriate in the absence of the quick command. According to an embodiment, in the case where the received text data does not include the expression 1010 assigned to the quick command, the quick command management module 160 of the user terminal 100 may notify the intelligence server 200 that the voice input according to the utterance of the user is not a quick command. In this case, the NLU module 220 of the intelligence server 200 may perform grammatical analysis or semantic analysis associated with the text data to determine user intent. Moreover, the response generating module 270 of the intelligence server 200 may generate a response to be transmitted to the user terminal 100, depending on the content (e.g., the detected intent of the user) of the text data. For example, the path planner module 230 of the response generating module 270 may determine the one path rule or the plurality of path rules by using the user intent and the parameter. Afterwards, the intelligence server 200 may transmit the determined path rules to the user terminal 100, and the user terminal 100 receiving the path rules may execute one or more apps (e.g., the first app 141 and the second app 143) depending on the path rules. In an embodiment, in the case where the received text data does not include the expression 1010 assigned to the quick command, the quick command management module 160 may transmit voice data corresponding to the voice input to the intelligence server 200 without transmitting the presence or absence of the quick command to the intelligence server 200.

According to an embodiment, the user terminal 100 may convert voice data corresponding to the received voice input through an ASR module included in the user terminal 100, instead of transmitting the voice data to the intelligence server 200 and receiving the converted text data from the intelligence server 200 as in operation 1120 and operation 1130.

According to an embodiment, the user terminal 100 may extract the pieces of information 1060 defining the state of the user terminal 100 according to each path rule in the quick command data 1000 and may perform tasks based on the pieces of information 1060, instead of transmitting information about a plurality of tasks corresponding to the quick command to the intelligence server 200 and of receiving pieces of information about the sequence of states of the user terminal 100 associated with the execution of the plurality of tasks from the intelligence server 200 as in operation 1160 and operation 1170.

Figure 11B:
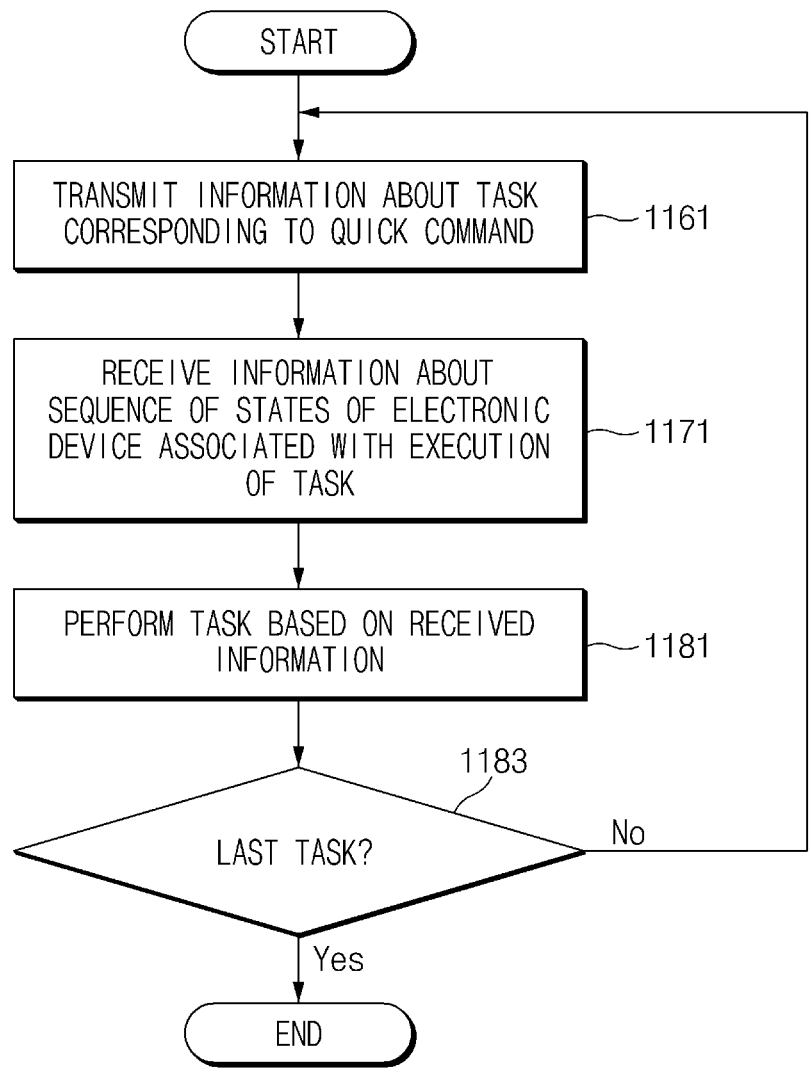
FIG. 11B is a flowchart illustrating an operating method of an electronic device associated with voice data processing, according to another embodiment of the present disclosure.

FIG. 11B is a flowchart illustrating an operating method of an electronic device associated with voice data processing, according to another embodiment of the present disclosure.

In FIG. 11A, information about a plurality of tasks set to the quick command is transmitted to the intelligence server 200 in the case where an expression assigned to a quick command is uttered. In FIG. 11B, it is described that information about each of the tasks is sequentially transmitted to the intelligence server 200.

Referring to FIG. 11B, when a voice input corresponding to the utterance of a user is detected as including or otherwise indicating a quick command, in operation 1161, an electronic device (e.g., the intelligence agent 145) may transmit information (e.g., the identifier 1030 of the path rule or the utterance content 1040 of the user) indicating at least one task among a plurality of tasks corresponding to the quick command to the server. In an embodiment, the quick command management module 160 may determine the type of the transmitted task and may determine whether to process information (e.g., the identifier 1030 of the path rule or the utterance content 1040 of the user) associated with the task depending on the type of the task in the user terminal 100, whether to transmit the information to the intelligence server 200, or whether to transmit the information to another server. For example, in the case where the task is capable of being performed through the path rule, the quick command management module 160 may transmit the identifier 1030 of the path rule or the utterance content 1040 of the user to the intelligence server 200 through the intelligence agent 145. For another example, the quick command management module 160 may determine a path rule associated with the execution of the task among at least one or more path rules (or path rule set) stored in the user terminal 100 by using information (e.g., the identifier 1030 of the path rule or the utterance content 1040 of the user) associated with the task and may perform the task depending on the determined path rule. For example, the user terminal 100 may perform the task based on the information 1060 defining the state of a device according to the path rule. For another example, in the case where the task is performed in the chatbot format or the open QA format, the quick command management module 160 may transmit the utterance content 1040 of the user to a chatbot server or an open QA server.

When receiving the identifier 1030 of the path rule for performing the task or the utterance content 1040 of the user, the intelligence server 200 may determine information (e.g., path rule) about the sequence of states of the user terminal 100 associated with the execution of the task, by using the identifier 1030 of the path rule or the utterance content 1040 of the user. Furthermore, the intelligence server 200 may transmit the determined information about the sequence of states to the user terminal 100.

In operation 1171, the electronic device (e.g., the intelligence agent 145) may receive information about the sequence of states of the electronic device associated with the execution of the task. For example, the user terminal 100 may receive a path rule for performing the task from the intelligence server 200 through the intelligence agent 145.

In operation 1181, the electronic device (e.g., the execution manager module 147) may perform the task based on the received information. According to an embodiment, the intelligence agent 145 of the user terminal 100 may transmit the received path rule to the execution manager module 147, and the execution manager module 147 may execute apps depending on the path rule.

In operation 1183, an electronic device (e.g., the quick command management module 160) may determine whether a task performed is indicated as the last task included in the quick command. According to an embodiment, the quick command management module 160 may verify the information 1080 indicating whether the task is the last task of the quick command data 1000 and may determine whether the task is the last task. If so, the operation may terminate. In the case where the task is not the last task, the electronic device may return to operation 1161 for the purpose of performing another task included in the quick command.

In the above-described descriptions, an embodiment is exemplified as the electronic device (e.g., the user terminal 100) transmits information associated with tasks to the intelligence server 200 and receives information about the sequence of states of the electronic device associated with the tasks from the intelligence server 200 for the purpose of performing a plurality of tasks included in the quick command. However, embodiments of the present disclosure are not limited thereto. According to various embodiments, the electronic device may perform at least one task associated with the quick command in the electronic device without interaction with the intelligence server 200. For example, when the expression 1010 assigned to the quick command is uttered, the electronic device may search for the quick command data 1000 mapped to the specified expression 1010, in the memory 140. Moreover, when the quick command data 1000 mapped to the specified expression 1010 is present, the electronic device may perform tasks by using the information 1060 defining the state of a device according to the path rule of the quick command data 1000.

Figure 12:
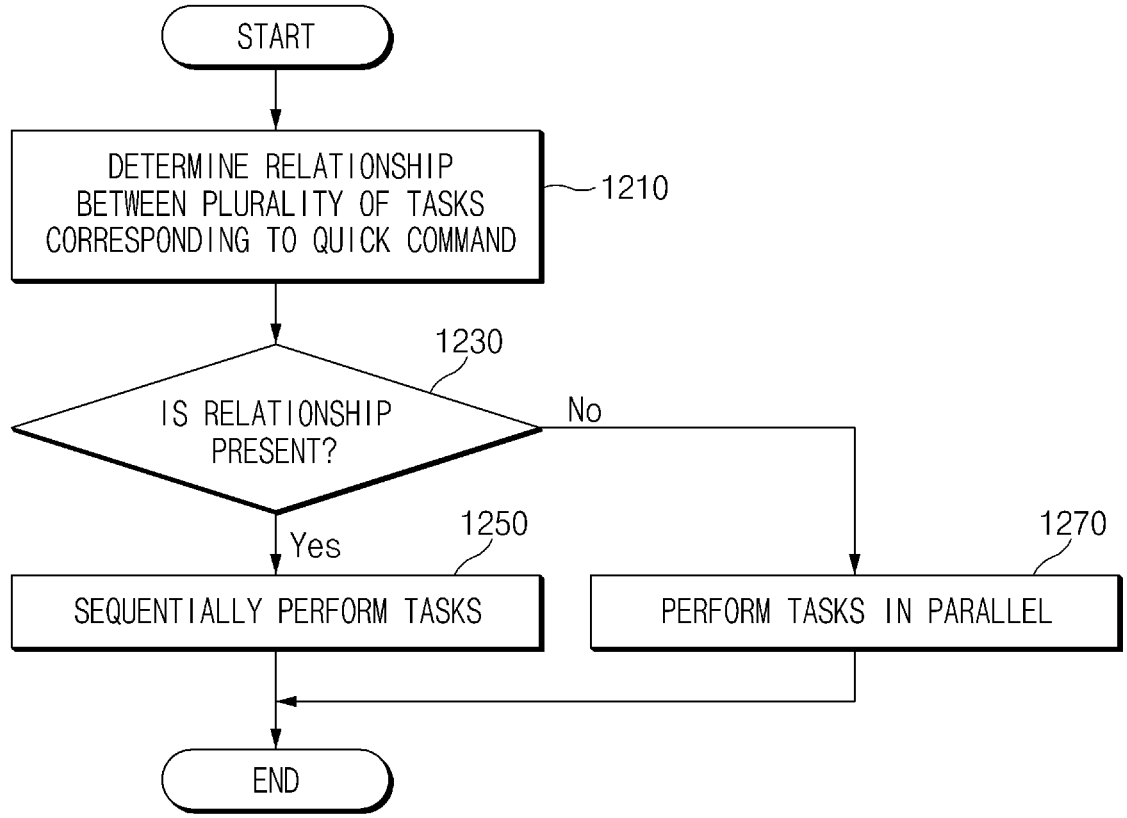
FIG. 12 is a flowchart for describing a method of performing a plurality of tasks, according to an embodiment of the present disclosure.

FIG. 12 is a flowchart for describing a method of performing a plurality of tasks, according to an embodiment of the present disclosure.

Referring to FIG. 12, when a quick command is detected as indicated by a user's utterance, in operation 1210, an electronic device (e.g., the user terminal 100) may determine a relationship between a plurality of tasks corresponding to the quick command. According to an embodiment, in the case where there are a plurality of tasks executable responsive to the quick command, the quick command management module 160 of the user terminal 100 may determine the relationship between the plurality of tasks. For example, one such relationship may indicate whether a second task is to be performed depending on the execution result of a first task (e.g., the first and second tasks being among a plurality of tasks corresponding to the quick command). In another example, when the execution result of the second task is different depending on the execution result of a first task among a plurality of tasks defined as the quick command, the quick command management module 160 may determine that the first task and the second task are relationally interconnected with each other.

In operation 1230, the electronic device may determine whether the plurality of tasks have interrelationships and that they are interconnected with each other. For example, the quick command management module 160 of the user terminal 100 may distinguish interconnected tasks from non-interconnected tasks among the plurality of tasks.

When the relationship between the plurality of tasks is present, in operation 1250, the electronic device may sequentially perform the tasks according to a specified order. In contrast, when the relationship between the plurality of tasks is absent, in operation 1270, the electronic device may perform the tasks in parallel. Accordingly, the user terminal 100 may perform tasks having one or more interrelationships based on an order in operation 1250. Conversely, the user terminal 100 may perform tasks that are not interconnected in parallel, as in operation 1270.

As described above, according to various embodiments, a voice data processing method of an electronic device (e.g., the user terminal 100) including a memory (e.g., the memory 140) storing a first expression mapped to first information about a plurality of first tasks may include receiving a first voice input of a user through a microphone (e.g., the microphone 111), transmitting voice data corresponding to the first voice input to an external server (e.g., the intelligence server 200) capable of performing automatic speech recognition (ASR) through a communication circuit, receiving a first text data generated as a result of the ASR associated with the voice data, from the external server through the communication circuit, searching for the first expression corresponding to the first text data in the memory, when the first expression corresponding to the first text data is present in the memory, transmitting the first information about the first tasks mapped to the first expression to the external server through the communication circuit, receiving second information about a sequence of states of the electronic device for executing the first tasks determined based on the first information, from the external server through the communication circuit, and executing the first tasks based on the second information. The first expression may include a specified word, a specified phrase, or a specified sentence so as to be different from first voice commands for explicitly requesting the execution of the first tasks.

According to various embodiments, the voice data processing method may further include mapping a second expression to third information about a plurality of second tasks at least partly different from the first tasks to store the mapped result in the memory based on at least one of recommendation information, utterance history information of the user, at least one second voice command executable by the electronic device and stored in advance in the memory, the first expression, or a second voice input of the user received through the microphone. And the second expression may include a specified word, a specified phrase, or a specified sentence so as to be different from third voice commands for explicitly requesting execution of the second tasks.

According to various embodiments, the voice data processing method may further include, in the mapping of the second expression to the third information about the second tasks based on the second voice input, when a portion of fourth information about a sequence of states of the electronic device for executing the second tasks is not present in second text data corresponding to the second voice input, providing an interface that allows the user to enter fifth information corresponding to the portion of the fourth information.

According to various embodiments, the providing of the interface may include outputting an object for inducing the user to enter a third voice input corresponding to the fifth information through the microphone, through at least one of a speaker or a display included in the electronic device.

According to various embodiments, the providing of the interface may include outputting an object for inducing the user to enter the fifth information through a touchscreen display (e.g., the display 120) included in the electronic device, through the display.

According to various embodiments, the outputting of the object may include outputting at least one of an object for providing a hint associated with the fifth information or an object for displaying a list capable of selecting the fifth information.

According to various embodiments, the voice data processing method may further include providing an interface for editing the first expression and the first information about the first tasks mapped to the first expression.

Figure 13:
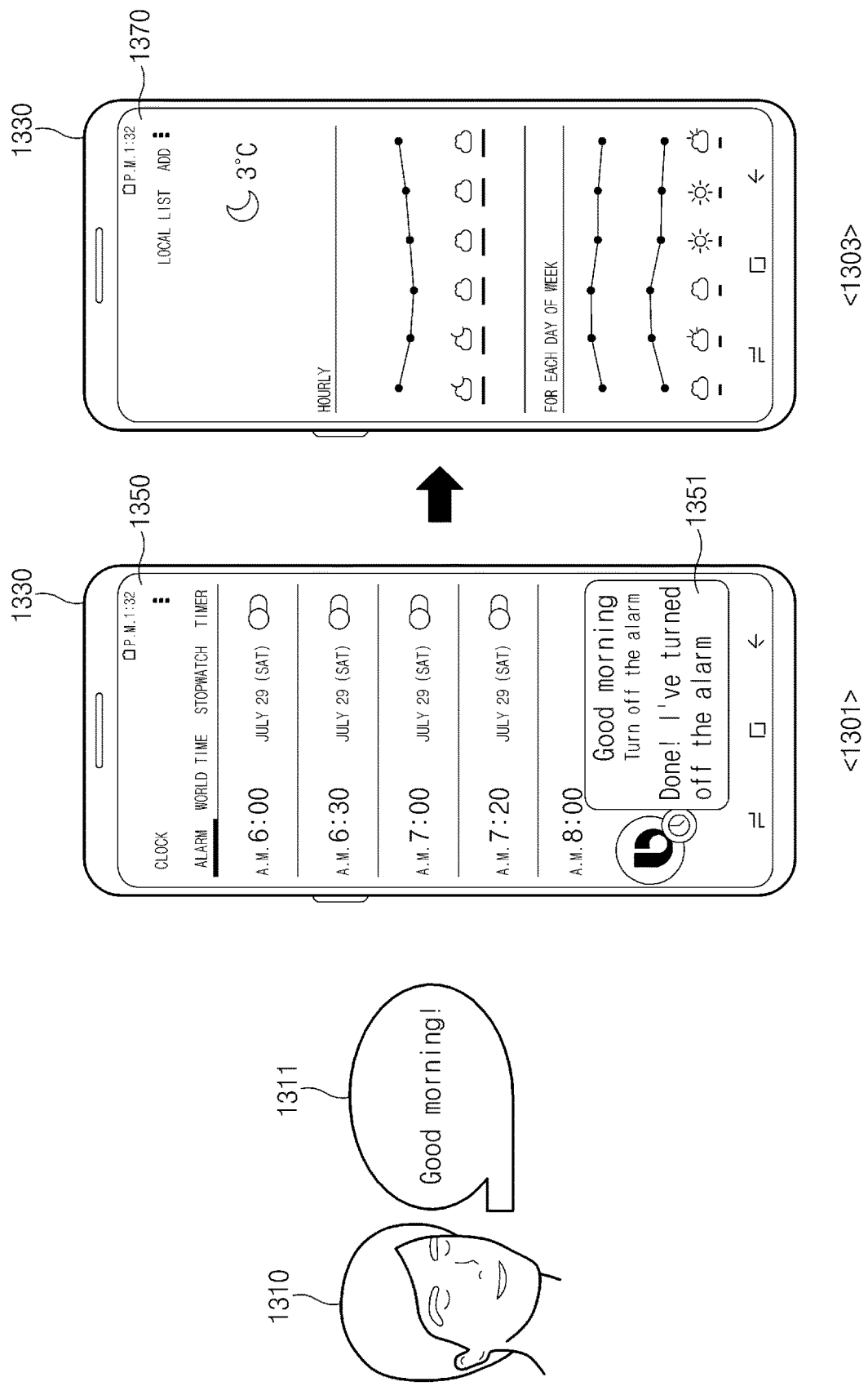
FIG. 13 is a flowchart for describing a method of sequentially performing a plurality of tasks, according to an embodiment of the present disclosure.

FIG. 13 is an example illustration of a method of sequentially performing a plurality of tasks, according to an embodiment of the present disclosure.

According to an embodiment, when a voice input is received corresponding to the utterance of a user 1310, an electronic device 1330 (e.g., the user terminal 100) may transmit voice data 1311 received via the voice input to the intelligence server 200. In addition, the electronic device 1330 may receive a transmission of text data derived from conversion of the voice data 1311 from the intelligence server 200, and may determine whether the received text data includes an expression 1010 pre-assigned to a quick command. In an embodiment, the electronic device 1330 may convert the voice data 1311 to text data through an ASR module included in the electronic device 1330 and may determine whether the converted text data includes an expression 1010 assigned to a quick command, instead of transmitting the voice data 1311 to the intelligence server 200 for the extraction.

According to an embodiment, when the voice input of the user 1310 corresponds to the quick command, the electronic device 1330 may (responsively) transmit, to the intelligence server 200, pieces of information (e.g., the identifier 1030 of the path rule or the utterance content 1040 of the user) regarding a plurality of tasks corresponding to the quick command. Furthermore, the electronic device 1330 may receive path rules for performing the plurality of tasks from the intelligence server 200 and may execute an app depending on the path rules. In an embodiment, the electronic device 1330 may extract the pieces of information 1060 defining the state of the electronic device 1330 according to each path rule in the quick command data 1000 and may execute the app based on the pieces of information 1060, instead of transmitting the identifier 1030 of the path rule or the utterance content 1040 of the user to the intelligence server 200.

FIG. 13 illustrates the case where the user 1310 utters "Good morning" as a quick command. In this case, after identifying "Good morning" as the quick command, the electronic device 1330 may search a database for at least one task to be performed when the quick command "Good morning" is received. For example, the electronic device 1330 may search the database for all quick command data 1000, in which the expression (e.g., FIG. 10, 1010) assigned to the quick command is "Good morning." In addition, the electronic device 1330 may transmit the identifier 1030 of the path rule or the utterance content 1040 of the user (which is included in the found at least one quick command data 1000) to the intelligence server 200, receive from the intelligence server 200 at least one path rule determined based on the identifier 1030 of the path rule or the utterance content 1040 of the user, and perform the at least one task according to the received path rule.

According to an embodiment, the electronic device 1330 may determine the path rule corresponding to the identifier 1030 of the path rule or the utterance content 1040 of the user among at least one path rule (or path rule set), which is pre-stored in the electronic device 1330, to perform the at least one task depending on the determined path rule, instead of transmitting the identifier 1030 of the path rule or utterance content 1040 of the user to the intelligence server 200.

According to an embodiment, in the case where there are a plurality of tasks corresponding to the quick command, the electronic device 1330 may sequentially perform the plurality of tasks. For example, in a first state 1301, the electronic device 1330 may perform a second task (e.g., retrieving weather information) after performing a first task (e.g., deactivating an alarm). FIG. 13 illustrates a state where, after "Good morning" is entered as the quick command, the electronic device 1330 outputs a result screen 1350 performing the first task to deactivate an alarm in the first state 1301, and output a result screen 1370 generated from performing the second task which is retrieving the daily weather, as seen in the a second state 1303. Accordingly, "explicit" voice commands are not needed, such as a first command reciting "turn off alarm" and a second command reciting "display weather." Instead, both functions operate according to the non-explicit command "good morning," increasing user convenience.

According to an embodiment, while sequentially performing the plurality of tasks, the electronic device 1330 may display a sequence of graphic elements corresponding the executed plurality of tasks (i.e., output the execution process of a task in a screen). Also, the electronic device 1330 may output a feedback display element 1351 associated with the execution of a task, together with the execution result screen of the task itself (i.e., such as the alarm screen 1350 or the weather screen 1370). That is, the electronic device 1330 may notify the user 1310 which task is being executed.

Figure 14:
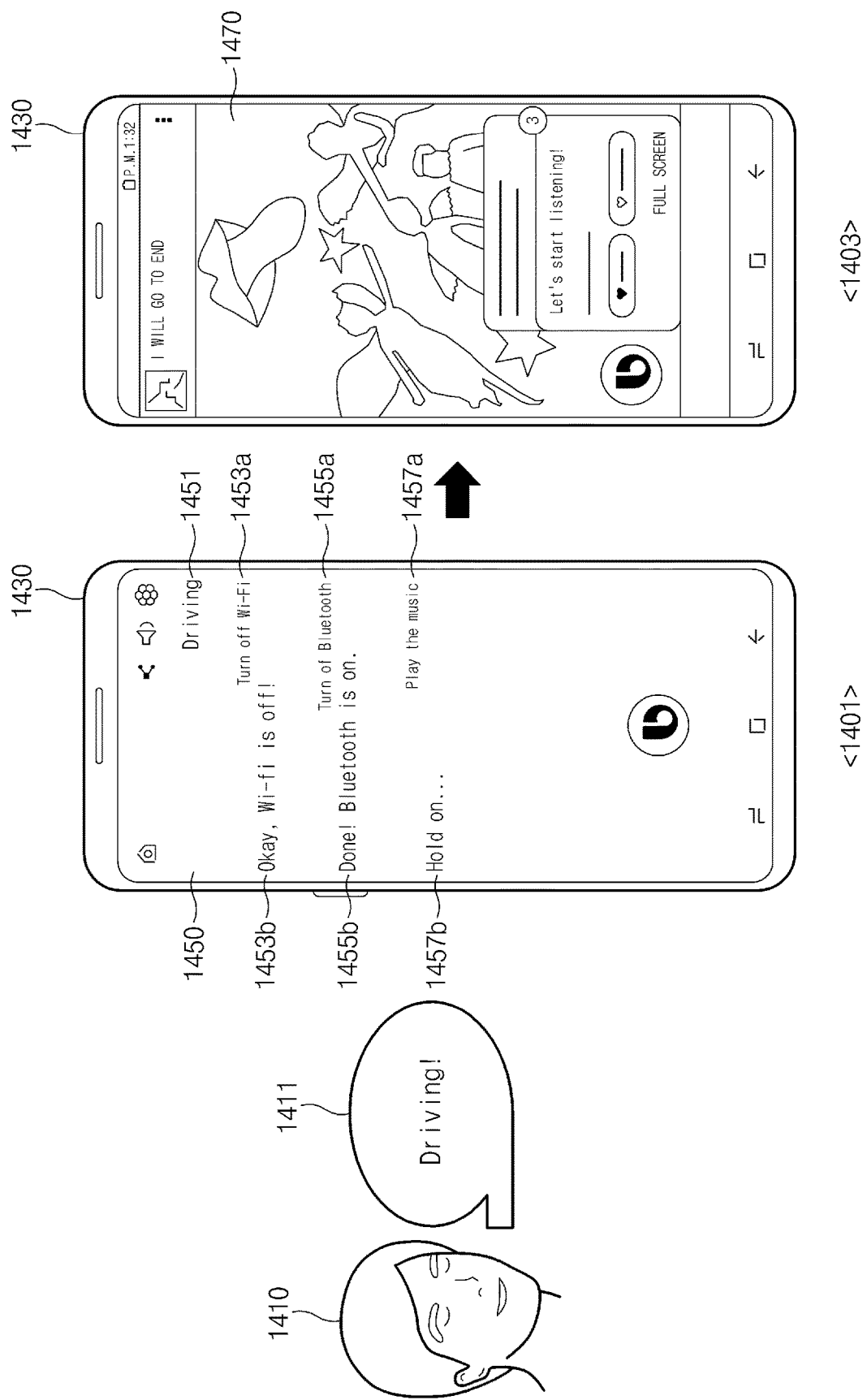
FIG. 14 is a view for describing a method of providing a feedback according to the execution of tasks, according to an embodiment of the present disclosure.

FIG. 14 is a view for describing a method of providing a feedback according to the execution of tasks, according to an embodiment of the present disclosure.

Referring to FIG. 14, when a voice input 1411 of a user 1410 corresponds to a quick command and there are a plurality of tasks corresponding to the quick command, an electronic device 1430 (e.g., the user terminal 100) may sequentially perform the plurality of tasks.

FIG. 14 illustrates the case where the user 1410 utters "Driving" as the quick command. The electronic device 1430 may sequentially perform a plurality of tasks when "Driving" is entered as the quick command. For example, the electronic device 1430 may sequentially perform a first task (e.g., turning off Wi-Fi), a second task (e.g., turning on Bluetooth), and a third task (e.g., playing music).

According to an embodiment, when sequentially performing the plurality of tasks, the electronic device 1430 may output feedback associated with the execution of the task in the screen, instead of outputting all the execution process of a task in a screen. For example, as in the first state 1401, the electronic device 1430 may output a screen 1450 providing the feedback associated with the execution of the task. For example, the screen 1450 may include feedback information 1453*b* about the execution of the first task, feedback information 1455*b* about the execution of the second task, and feedback information 1457*b* about the execution of the third task, together with an expression 1451 assigned to a quick command, a voice command 1453*a* for performing the first task, a voice command 1455*a* for performing the second task, and a voice command 1457*a* for performing the third task.

According to an embodiment, when operating another app depending on the characteristic of a task in addition to an app occupying the current screen, the electronic device 1430 may switch the screens between apps. For example, when launching a music playing app depending on the characteristic of the third task, in the second state 1403, the electronic device 1430 may switch the screen 1450 providing the feedback to an execution screen 1470 of the music playing app.

Figure 15:
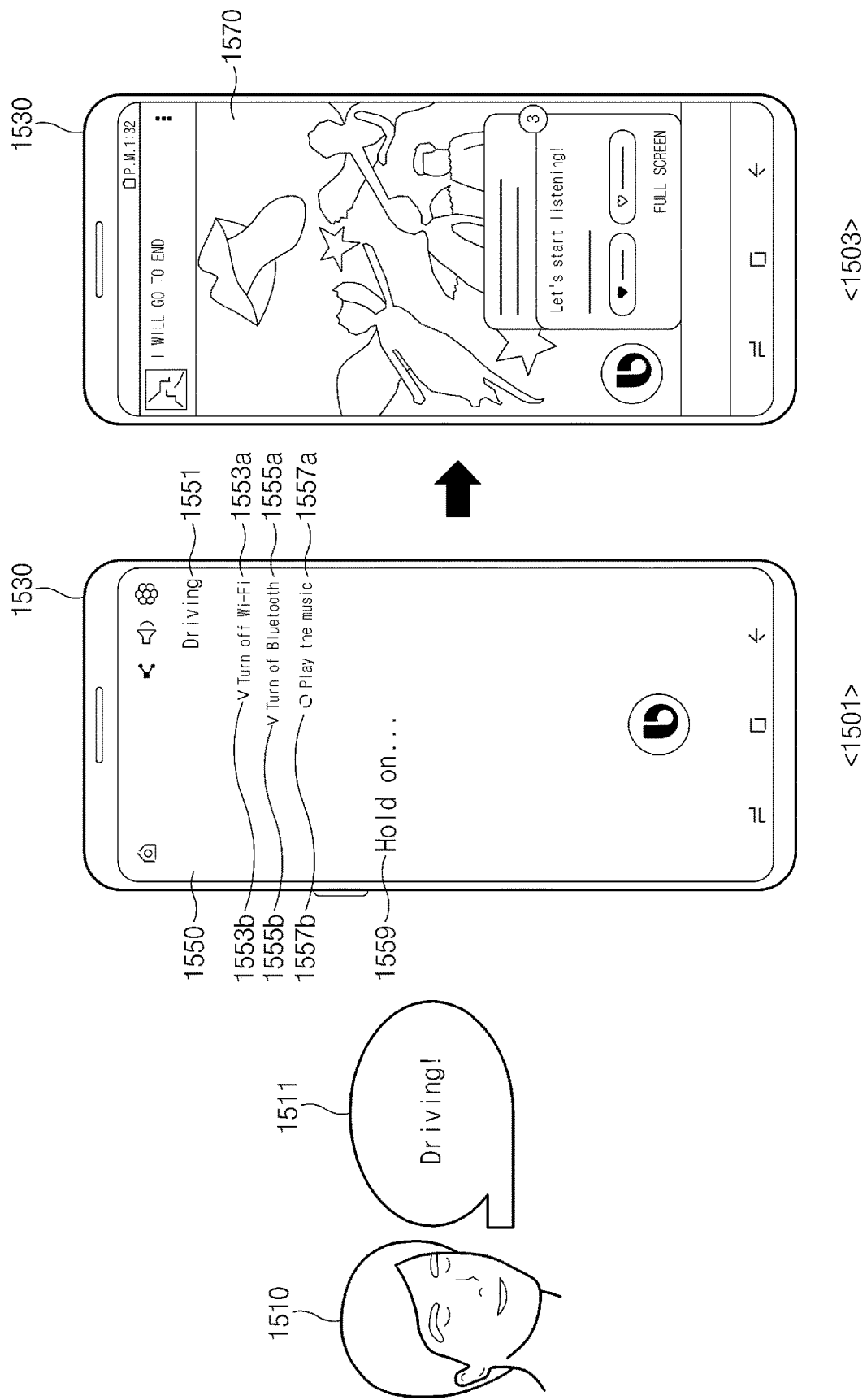
FIG. 15 is a view for describing a method of outputting the execution result of the last task without providing a feedback according to the execution of tasks, according to an embodiment of the present disclosure.

FIG. 15 is a view for describing a method of outputting the execution result of the last task without providing a feedback according to the execution of tasks, according to an embodiment of the present disclosure.

Referring to FIG. 15, in the case where a voice input 1511 of a user 1510 corresponds to a quick command, and there are a plurality of tasks associated with the quick command, an electronic device 1530 (e.g., the user terminal 100) may sequentially perform the plurality of tasks.

As in FIG. 14, FIG. 15 illustrates an example in which the user 1510 utters "Driving" as a quick command. The electronic device 1530 may sequentially perform a plurality of tasks associated with the quick command "Driving." For example, the electronic device 1530 may sequentially perform a first task (e.g., turning off Wi-Fi), a second task (e.g., turning on Bluetooth), and a third task (e.g., playing music).

According to an embodiment, while sequentially performing the plurality of tasks, the electronic device 1530 may output the execution result screen of the last task, instead of outputting the execution process of a task and a feedback associated with the execution of the task in a screen. That is, when performing the task, the electronic device 1530 may not provide the user 1510 with additional information (e.g., execution process information and feedback information). For example, as illustrated in the second state 1503, the electronic device 1530 may output an execution result screen 1570 of the last task, instead of outputting a screen providing a feedback associated with the execution of tasks. In an embodiment, as in a first state 1501, the electronic device 1530 may output a screen 1550 including information 1553*b* about the execution progress state of the first task, information 1555*b* about the execution progress state of the second task, and information 1557*b* about the execution progress state of the third task together with an expression 1551 assigned to a quick command, a voice command 1553*a* for performing the first task, a voice command 1555*a* for performing the second task, and a voice command 1557*a* for performing the third task, without feedback information according to the execution of a task. Also, when operating another app depending on the characteristic of a task in addition to an app occupying the current screen, the electronic device 1530 may switch the screens between apps. In this case, the electronic device 1530 may output a text 1559 saying that "hold on" until the execution screen of the other app is output.

Figure 16:
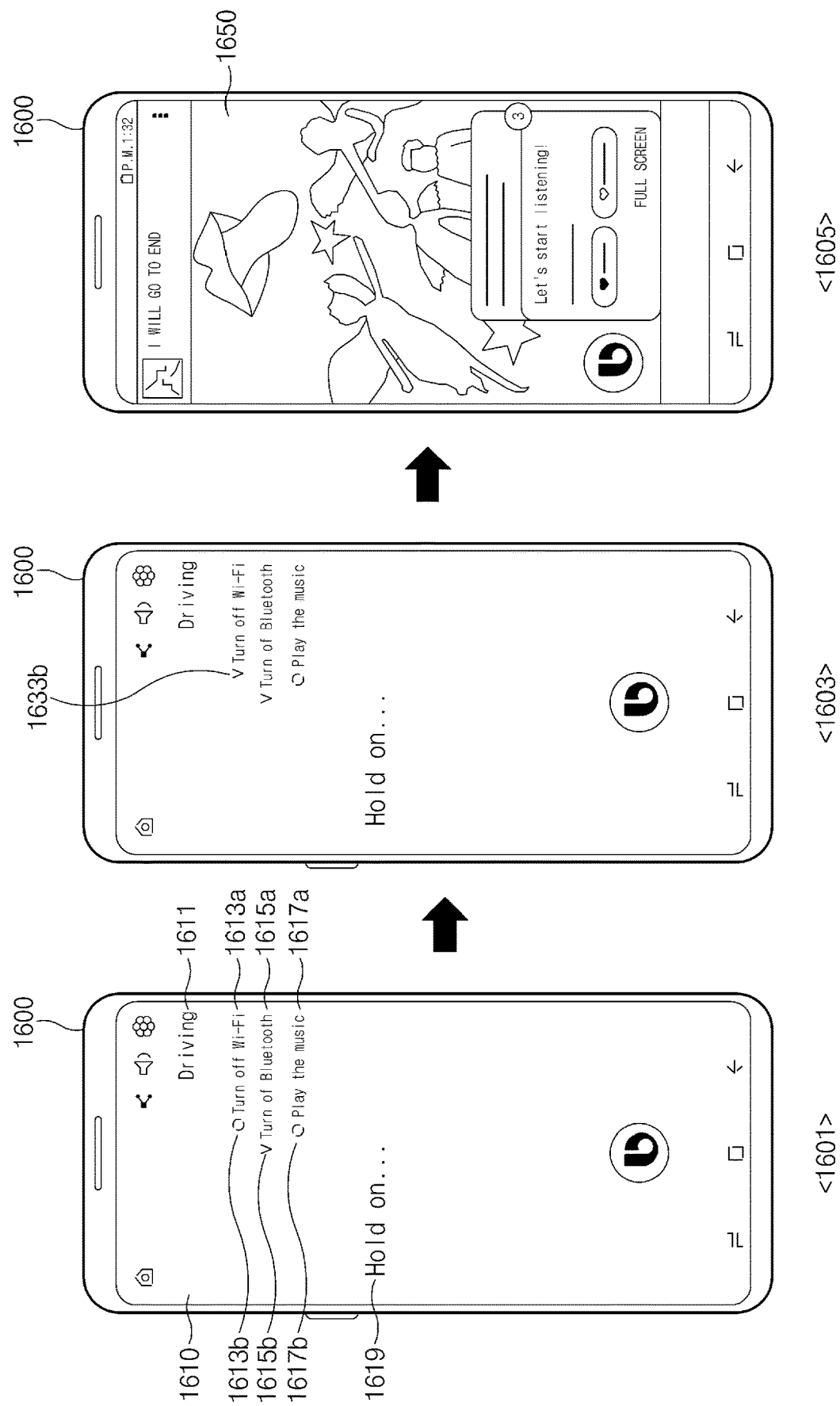
FIG. 16 is a diagram for describing a method of performing a plurality of tasks in parallel, according to an embodiment of the present disclosure.

FIG. 16 is a diagram for describing a method of performing a plurality of tasks in parallel, according to an embodiment of the present disclosure.

Referring to FIG. 16, in the case where the voice input of a user corresponds to a quick command and there are a plurality of tasks corresponding to the quick command, an electronic device 1600 (e.g., the user terminal 100) may determine the relationship between the plurality of tasks. Furthermore, in the case where the relationship between the plurality of tasks is absent, the electronic device 1600 may perform the plurality of tasks in parallel.

As in FIGS. 14 and 15, FIG. 16 illustrates the case where the user utters "Driving" as the quick command. The electronic device 1600 may determine the relationship between a plurality of tasks to be performed in the case where "Driving" is entered as a quick command; in the case where a predefined relationship between the plurality of tasks associated with the quick command "Driving" is absent, the electronic device 1600 may perform the plurality of tasks in parallel. For example, the electronic device 1600 may perform a first task (e.g., turning off Wi-Fi), a second task (e.g., turning on Bluetooth), and a third task (e.g., playing music) in parallel, rather than in sequence.

According to an embodiment, as in a first state 1601, the electronic device 1600 may output a screen 1610 including information 1613*b* indicating the execution progress state of the first task, information 1615*b* indicating the execution progress state of the second task, and information 1617*b* indicating the execution progress state of the third task together with an expression 1611 assigned to a quick command, a voice command 1613*a* for performing the first task, a voice command 1615*a* for performing the second task, and a voice command 1617*a* for performing the third task.

According to an embodiment, since the electronic device 1600 performs tasks in parallel, the electronic device 1600 may update each of the pieces of information 1613*b*, 1615*b*, and 1617*b* according to the execution progress state of a task included in the screen 1610. Updates may be generated upon completing the execution of each task, for the purpose of notifying the user whether the execution of a certain task is completed. For example, the first state 1601 indicates a state where the execution of the second task is completed, and a second state 1603 illustrates a state where the executions of the second task and the first task are completed. As such, as in the second state 1603, the electronic device 1600 may change information 1633*b* about the execution progress state of the first task.

According to an embodiment, when operating another app depending on the characteristic of a task in addition to an app occupying the current screen, the electronic device 1600 may switch the screens between apps. In this case, the electronic device 1600 may output a text 1619 saying that "hold on" until the execution screen of the other app is output. Furthermore, when the execution of the other app is completed, the electronic device 1600 may output an execution screen 1650 of the other app, as seen in the third state 1605.

Figure 17:
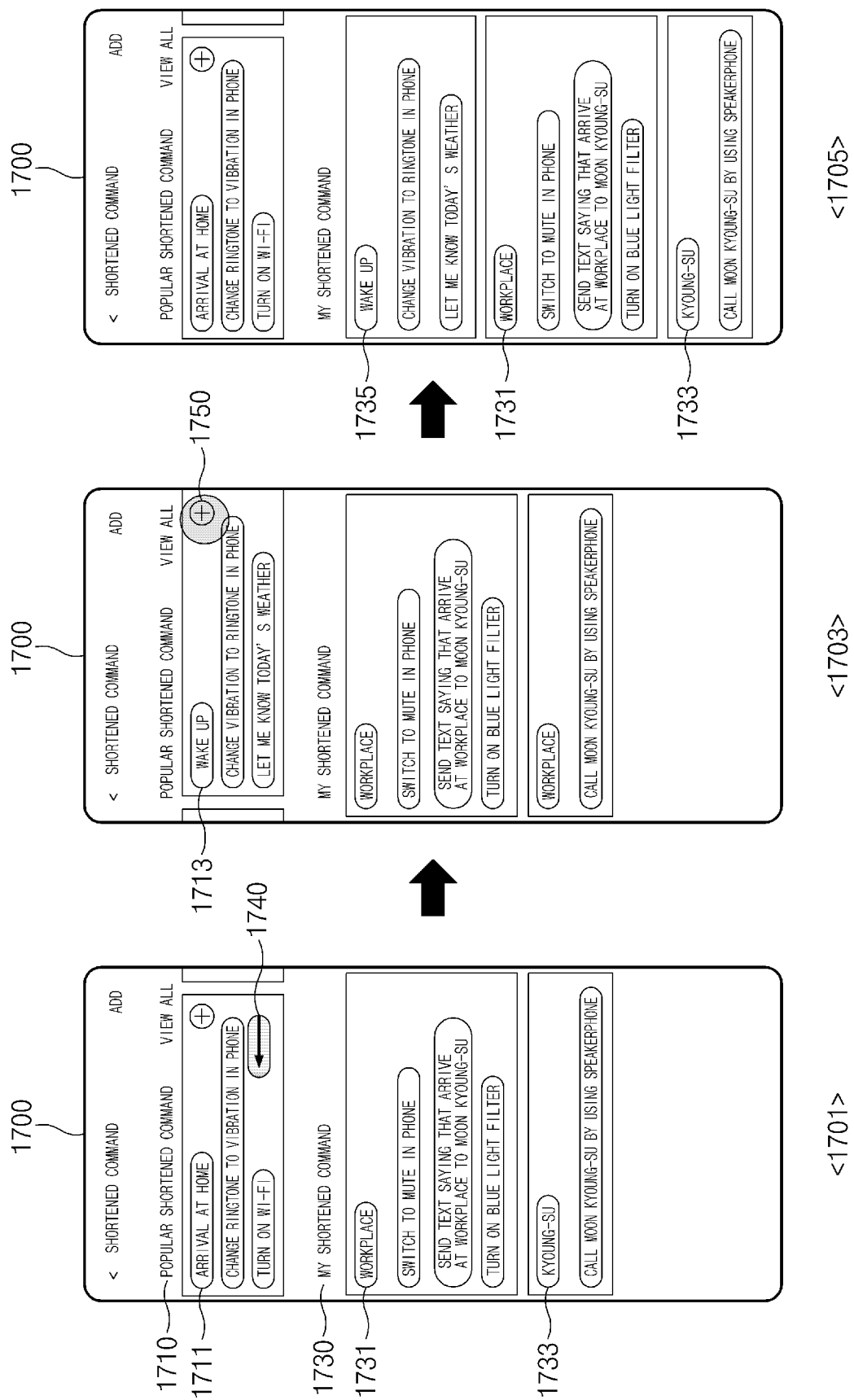
FIG. 17 is a view for describing a method of generating a quick command by recommendation, according to an embodiment of the present disclosure.

FIG. 17 is a view for describing a method of generating a quick command by recommendation, according to an embodiment of the present disclosure.

Referring to FIG. 17, an electronic device (e.g., the user terminal 100) may provide a recommended quick command, such as one preconfigured by the manufacturer of an electronic device with respect to commands that are likely to be used to activate the usage of a user's quick command. According to an embodiment, as in a first state 1701, the electronic device may output a screen 1700 capable of configuring quick commands. A description screen 1700 of the quick command may include a quick command list 1710 recommended by the manufacturer and a quick command list 1730 set by the user.

The quick command list 1710 recommended by the manufacturer may include at least one quick command item 1711 preconfigured (e.g., recommended) by the manufacturer. The recommended quick command items 1711 may include a phrase "arrival at home" for requesting the execution of a task and retrieval of certain information. Further examples seen in 1701 include the phrase "change the ringtone of my phone to vibration" corresponding to a first task to activate a vibration-mode, the phrase "turn on Wi-Fi" corresponding to a second task to activate Wi-Fi.

The quick command list 1730 set by the user may include a quick command item (e.g., a first quick command item 1731 or a second quick command item 1733) set by the user.

The quick command item set by the user may include a specified expression for requesting the execution of a task and information about at least one task to be performed upon uttering the specified expression.

According to an embodiment, the quick command list 1710 recommended by the manufacturer may change the quick command item displayed in the screen 1700 in response to a swipe input. For example, when an input 1740 of a swipe from right to left occurs in an area where the quick command list 1710 recommended by the manufacturer is displayed, as in a second state 1703, the electronic device may change the quick command item 1711, which is displayed in the screen 1700, to a quick command item 1713 of the next order among quick command items included in the quick command list 1710. Likewise, when an input 1740 of a swipe from left to right occurs in an area where the quick command list 1710 recommended by the manufacturer is displayed, the electronic device may change a quick command item, which is currently displayed in the screen 1700, to a quick command item of the previous order among quick command items included in the quick command list 1710.

According to an embodiment, when an additional button 1750 included in the quick command item 1713 is selected, then as depicted in the third example state 1705, the electronic device may add the selected quick command item 1713 to the quick command list 1730 set by the user. In this case, the electronic device may display a newly added third quick command item 1735 "Wake Up" (e.g., the quick command item 1713) closer to the top end of the screen 1700 compared with other quick command items (e.g., the first quick command item 1731 and the second quick command item 1733).

According to an embodiment, the electronic device may train recognition of the generated (or set) quick command when the quick command is generated (or set). For example, the electronic device may prompt the user to utter the generated (or set) quick command more than a specified number of times and may improve recognition of the corresponding quick command based on repeated analysis of the voice input according to the user's utterance. As such, the electronic device may train recognition of a quick command with a user-specific utterance pattern to improve the ability to execute the quick command.

Figure 18:
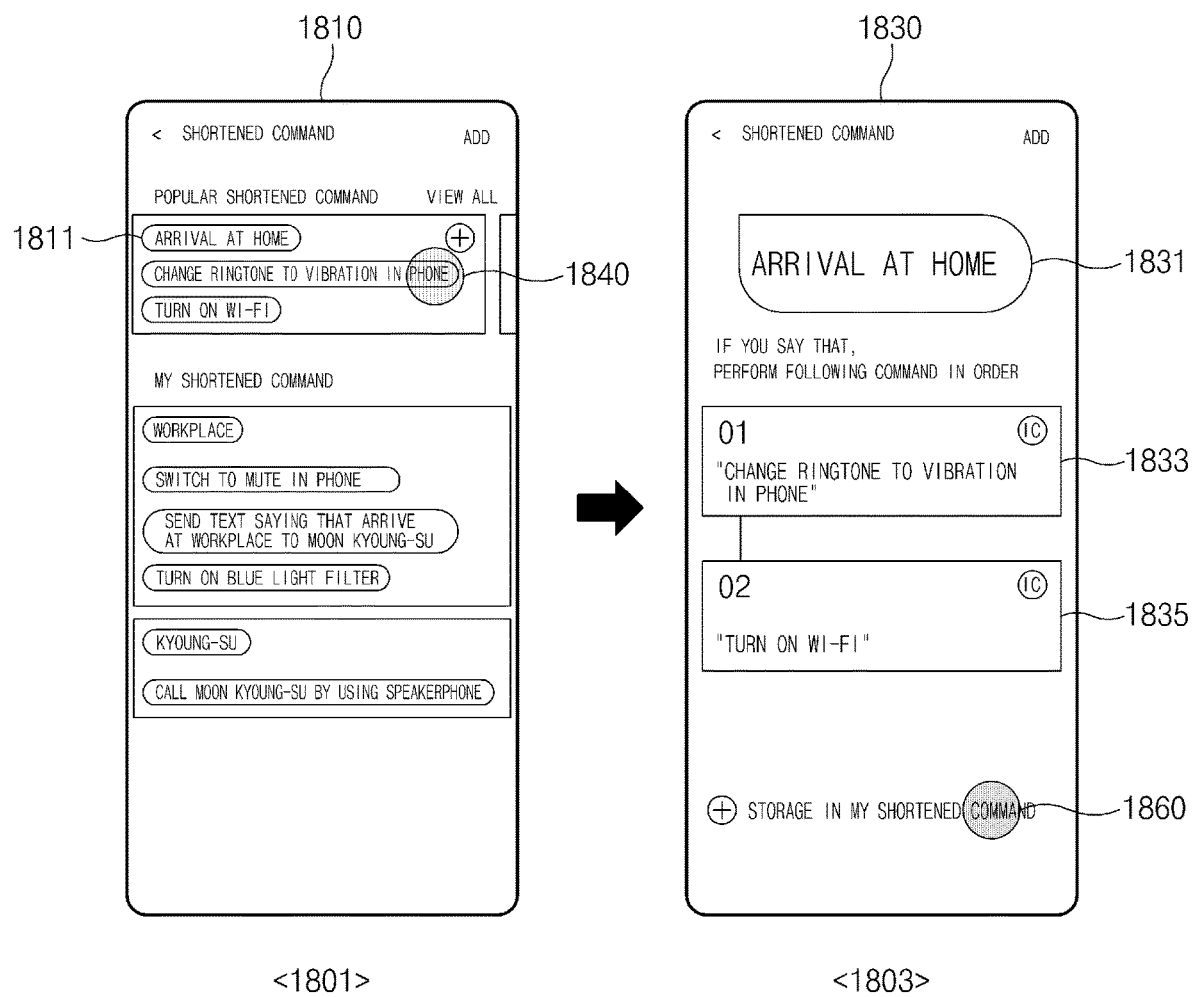
FIG. 18 is a view for describing a method of generating a quick command by recommendation, according to an embodiment of the present disclosure.

FIG. 18 is a view for describing a method of generating a quick command by recommendation, according to an embodiment of the present disclosure.

Referring to FIG. 18, when in a first state 1801, an electronic device (e.g., the user terminal 100) may output a screen 1810 capable of facilitating configuration of quick commands. The description screen 1810 of the quick command may include a quick command list preconfigured (e.g., recommended) by the manufacturer and a quick command list that is custom configured by the user.

According to an embodiment, when receiving an input 1840 selecting one quick command item 1811 included in a quick command list, as in a second state 1803, the electronic device may output a screen 1830 including detailed information related to the selected quick command item 1811.

For example, the detailed content screen 1830 of the quick command item 1811 may include the specified expression or activating phrase 1831 of the quick command (e.g., "arrival at home") for requesting the execution of a task, information (e.g., information 1833 about a first task, information 1835 about a second task) about at least one task to be performed upon uttering the specified expression 1831, and a storage button 1860 of the quick command item 1811. FIG. 18 illustrates an example in which two tasks are performed in response to detecting input of the quick command set triggered by the phrase "arrival at home". For example, when a user utters "arrival at home", the electronic device may perform a first task (e.g., changing the ringtone of my phone to vibration) and a second task (e.g., turning on Wi-Fi) sequentially or in parallel.

Figure 19:
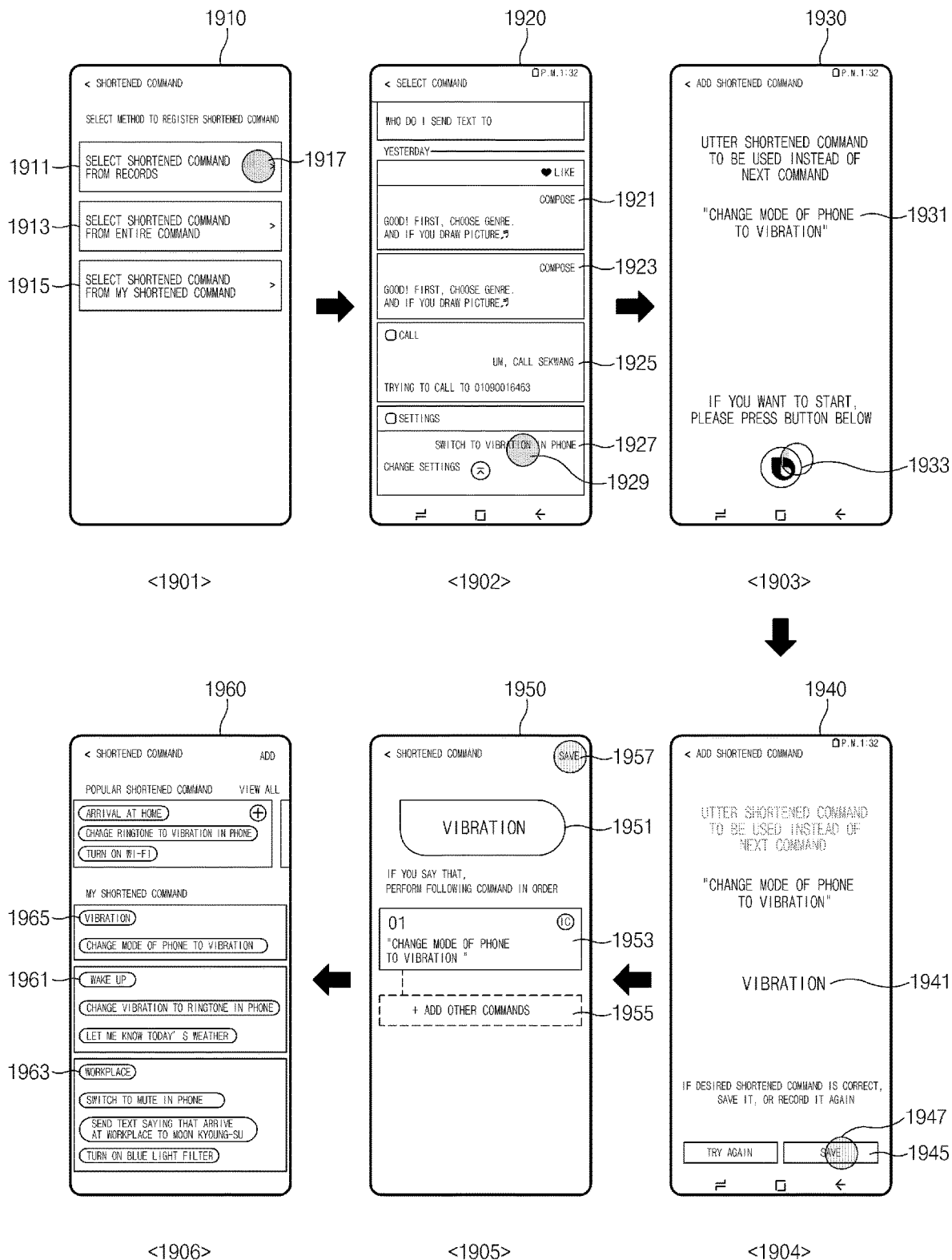
FIG. 19 is a view for describing a method of generating a quick command by utterance history information of a user, according to an embodiment of the present disclosure.

FIG. 19 is a view for describing a method of generating a quick command by utterance history information of a user, according to an embodiment of the present disclosure.

Referring to FIG. 19, an electronic device (e.g., the user terminal 100) may generate a quick command based on utterance history information of the user. As in a first state 1901, a screen 1910 capable of generating (or setting) a quick command may include an output button 1911 of the utterance history information of the user, a search button 1913 of a voice command, and an output button 1915 of the pre-stored quick command.

According to an embodiment, when an input 1917 to select the output button 1911 of the utterance history information of the user is generated, as in a second state 1902, the electronic device may output a history information screen 1920 associated with the utterance made by the user and a task performed by the user's utterance. For example, the history information screen 1920 may align and display history information items, which are generated by the user's utterance to perform the task, in the order of the utterance time. For example, the most recently uttered first history information item 1921 may be output closest to the upper end of the screen 1920, and the second history information item 1923, the third history information item 1925, and the fourth history information item 1927 that have been uttered previously may be sequentially output in the direction of the lower end of the screen 1920 in order.

When an input 1929 to select one history information item among the history information items is generated, as in a third state 1903, the electronic device may output a screen 1930 for setting the selected history information item to a quick command. For example, for the purpose of mapping content 1931, which is previously uttered by the user, to a specified expression, the screen 1930 may provide an interface capable of setting the specified expression, through a voice input. That is, the screen 1930 may include a voice input button 1933.

When the voice input button 1933 is selected, as in a fourth state 1904, the electronic device may receive a voice input from the user and may output a screen 1940 including content 1941 of the received voice input, a button 1943 for receiving a voice input again, and a button 1945 for setting the received voice input to the specified expression.

When an input 1947 to select the setting button 1945 of the specified expression is received, as in a fifth state 1905, an electronic device may output a detailed content screen 1950 of the quick command item. For example, the detailed content screen 1950 of the quick command item may include a specified expression 1951 (i.e., "Vibration") for requesting the execution of a task, information 1953 about at least one task to be performed upon uttering the specified expression 1951, an additional button 1955 of a task, and a storage button 1957 of the quick command item.

When the storage button 1957 of the quick command item is selected, as in a sixth state 1906, the electronic device may output a screen 1960 illustrating a quick command list set by the user. The screen 1960 illustrating the quick command list set by the user may include the preset quick command item (e.g., a first quick command item 1961, a second quick command item 1963, and a newly added third quick command item 1965). According to an embodiment, the electronic device may display the newly added third quick command item 1965 so as to be closer to the top end of the screen 1960 compared with other quick command items (e.g., the first quick command item 1961 and the second quick command item 1963).

Figure 20:
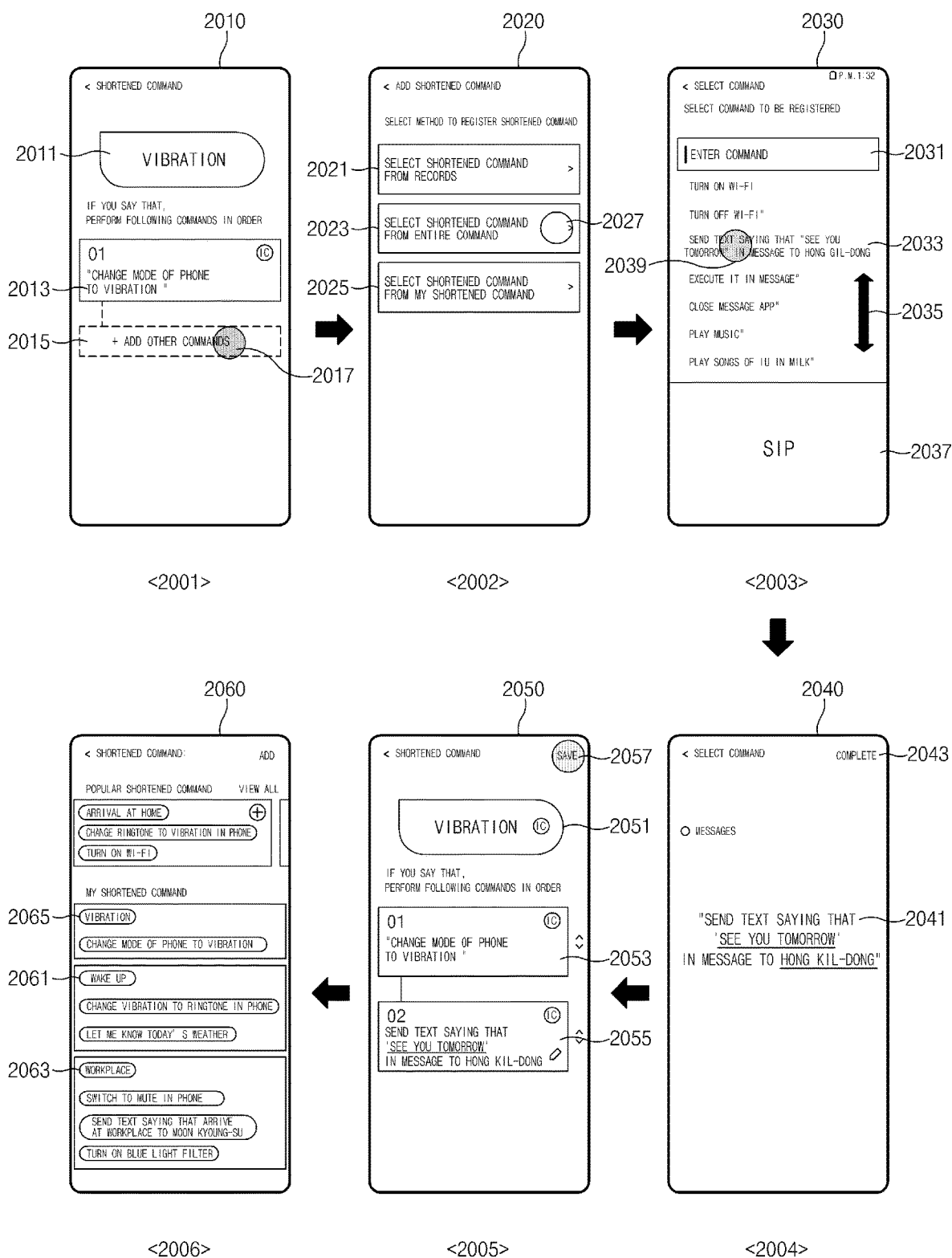
FIG. 20 is a view for describing a method of generating a quick command through searching for a voice command, according to an embodiment of the present disclosure.

FIG. 20 is a view for describing a method of generating a quick command through searching for a voice command, according to an embodiment of the present disclosure.

Referring to FIG. 20, an electronic device (e.g., the user terminal 100) may provide a method of generating a quick command through searching for a voice command. According to an embodiment, as in a first state 2001, the electronic device may output a detailed content screen 2010 of a quick command item. For example, the detailed content screen 2010 of the quick command item may include a specified expression 2011 for requesting the execution of a task, information 2013 about at least one task to be performed upon uttering the specified expression 2011, and an additional button 2015 of a task.

When an input 2017 to select the additional button 2015 of a task is received, as in a second state 2002, the electronic device may output a screen 2020 capable of generating (or setting) a quick command. For example, the screen 2020 capable of generating (or setting) a quick command may include an output button 2021 of the utterance history information of the user, a search button 2023 of a voice command, and an output button 2025 of the pre-stored quick command.

When an input 2027 to select the search button 2023 of the voice command is generated, as in a third state 2003, an electronic device may output a screen 2030 capable of searching for a voice command to be used for the electronic device. For example, the search screen 2030 of the voice command may include a search word input field 2031 and a voice command list 2033.

According to an embodiment, a voice command item displayed in the screen 2030 may be changed by a scroll input 2035 in the voice command list 2033. In addition, when the search word input field 2031 is focused, the electronic device may display a soft input panel (SIP) 2037 for entering a search word in the lower end of the screen 2030.

When an input 2039 to select one voice command item included in the voice command list 2033 is generated, as in a fourth state 2004, an electronic device may output a detailed content screen 2040 of the selected voice command item. For example, the detailed content screen 2040 of the voice command item may include content 2041 of the voice command and a storage button 2043 of the voice command.

When the storage button 2043 of the voice command is selected, as in a fifth state 2005, an electronic device may output a detailed content screen 2050 (e.g., the detailed content screen 2010 of the quick command item) of a quick command item. The detailed content screen 2050 of the quick command item may include a specified expression 2051 (e.g., the specified expression 2011) for requesting the execution of a task, information 2053 (e.g., the information 2013) about the preset task to be performed upon uttering a specified expression 2051, information 2055 about a task corresponding to the newly added voice command, and a storage button 2057 of the quick command item.

When the storage button 2057 of the quick command item is selected, as in a sixth state 2006, the electronic device may output a screen 2060 illustrating a quick command list set by the user. The screen 2060 illustrating the quick command list set by the user may include the preset quick command item (e.g., a first quick command item 2061, a second quick command item 2063), and a newly added third quick command item 2065. According to an embodiment, the electronic device may display the newly added third quick command item 2065 so as to be closer to the top end of the screen 2060 compared with other quick command items (e.g., the first quick command item 2061 and the second quick command item 2063).

Figure 21:
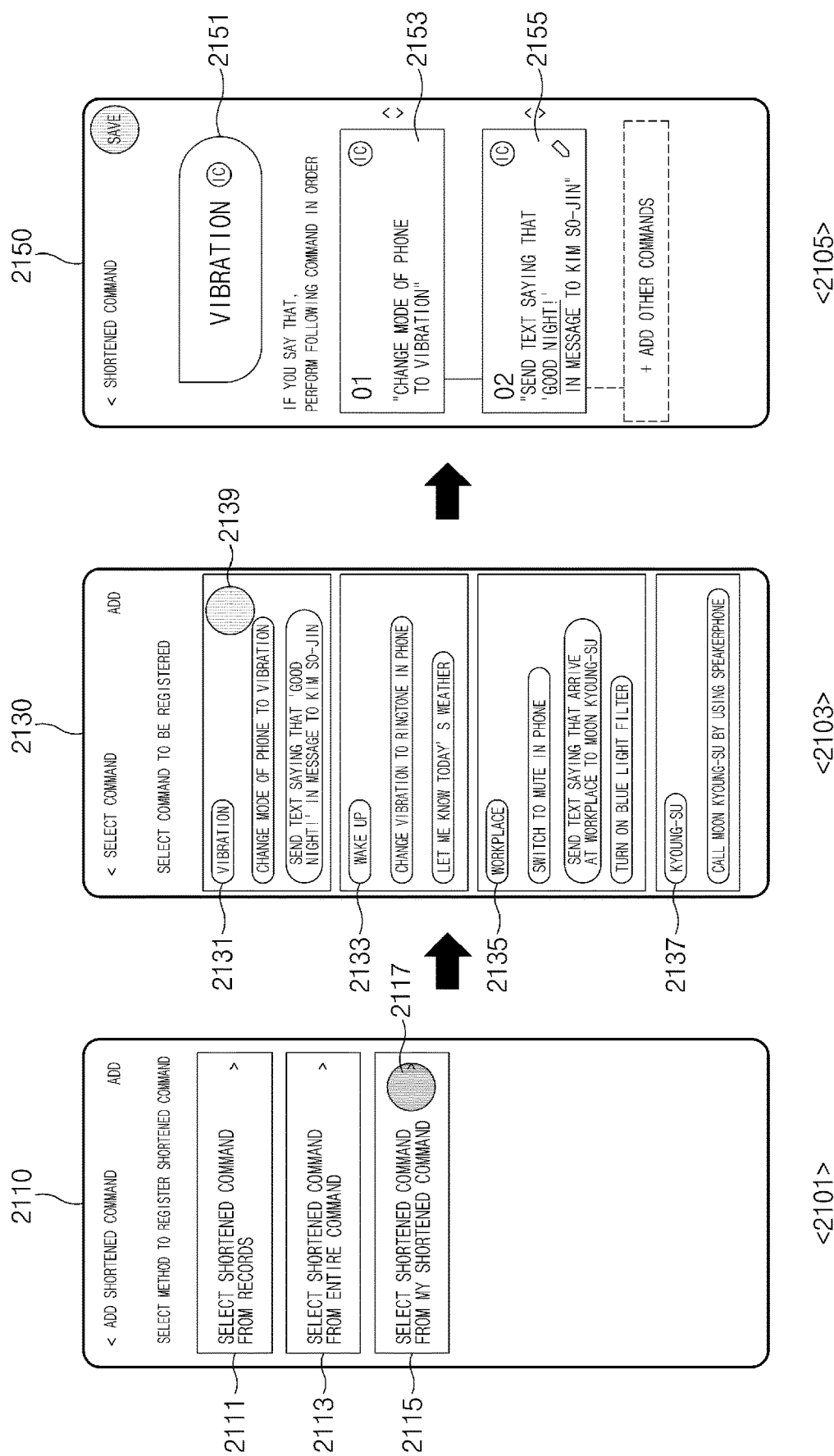
FIG. 21 is a view for describing a method of generating a quick command based on the pre-stored quick command, according to an embodiment of the present disclosure.

FIG. 21 is a view for describing a method of generating a quick command based on the pre-stored quick command, according to an embodiment of the present disclosure.

Referring to FIG. 21, an electronic device (e.g., the user terminal 100) may generate (or set) a new quick command based on the pre-stored quick command. As in a first state 2101, a screen 2110 capable of generating (or setting) a quick command may include an output button 2111 of the utterance history information of the user, a search button 2113 of a voice command, and an output button 2115 of the pre-stored quick command.

According to an embodiment, when an input 2117 to select the output button 2115 of the pre-stored quick command is generated, as in a second state 2103, the electronic device may output a screen 2130 including a quick command list set by the user. The quick command list set by the user may include a quick command item (e.g., a first quick command item 2131, a second quick command item 2133, a third quick command item 2135, or a fourth quick command item 2137) set by the user. The quick command item set by the user may include a specified expression for requesting the execution of a task and information about at least one task to be performed upon uttering the specified expression.

When an input 2139 to select one quick command item included in the quick command list is generated, as in a third state 2105, the electronic device may output a detailed content screen 2150 of the selected quick command item. For example, the detailed content screen 2150 of the quick command item may include a specified expression 2151 for requesting the execution of a task and information (e.g., information 2153 about a first task or information 2155 about a second task) about at least one task to be performed upon uttering the specified expression 2151. According to an embodiment, when one of pieces of information about a task is selected, the electronic device may add the selected task to the newly generated (or set) quick command.

Figure 22:
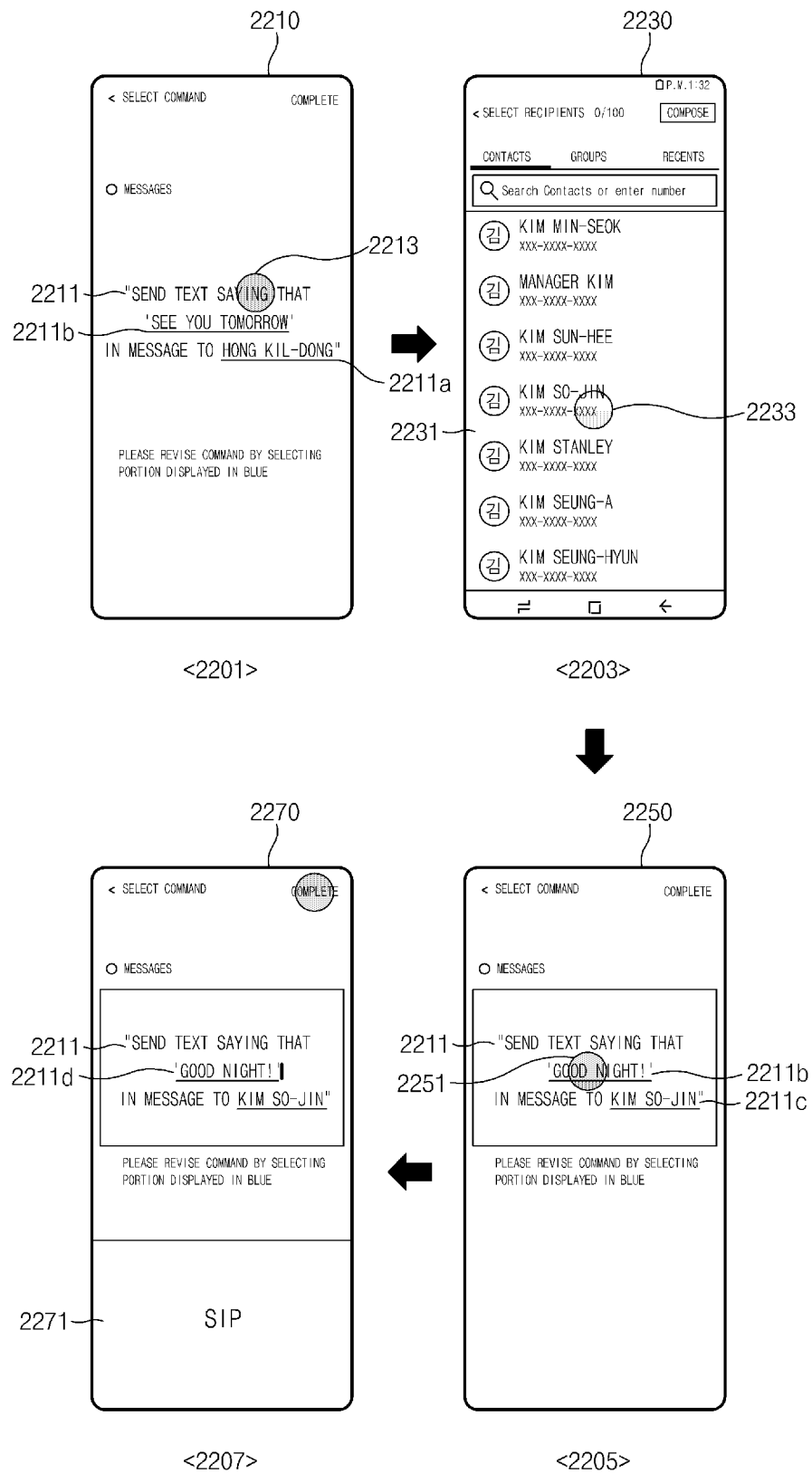
FIG. 22 is a view for describing a method of editing parameter information included in a voice command, according to an embodiment of the present disclosure.

FIG. 22 is a view for describing a method of editing parameter information included in a voice command, according to an embodiment of the present disclosure.

Referring to FIG. 22, an electronic device (e.g., the user terminal 100) may provide an interface for editing information about a task included in a quick command. According to an embodiment, the electronic device may provide the interface so as to edit parameter information included in the voice command for requesting the execution of a task. For example, as in a first state 2201, the electronic device may output a detailed information screen 2210 associated with a specific task. For example, the detailed information screen 2210 associated with a specific task may include content 2211 for requesting the execution of the specific task. Furthermore, the electronic device may display a changeable portion (e.g., parameter information) of the content 2211 of the voice command so as to be distinguished from other portions. FIG. 22 illustrates a state where a recipient 2211a (e.g., "Hong Kil-Dong") and message content 2211b (e.g., "see you tomorrow") corresponding to the parameter information upon sending the message are highlighted and displayed to be distinguished from other portions in the case where the content 2211 of the voice command is set to "send a text saying that 'see you tomorrow' in a message to Hong Kil-Dong".

When an input 2213 to select the recipient 2211a (first parameter information), as in a second state 2203, an electronic device may output a screen for editing the first parameter information based on the attribute of the selected first parameter information. For example, since the first parameter information has the attribute of the recipient that a user is capable of contacting, the electronic device may output a contact selection screen (or address book) 2230. In an embodiment, the electronic device may output a soft input panel 2271 in the lower end of a screen 2210 such that the user directly enters information (e.g., telephone number) about the recipient, instead of outputting the contact selection screen 2230.

When an input 2233 to select a contact item 2231 associated with a specific person is generated in the contact selection screen 2230, as in a third state 2205, the electronic device may output a detailed information screen 2250 (e.g., the detailed information screen 2210 associated with a specific task) associated with a specific task in which the recipient 2211a is changed to the specific person 2211c.

When an input 2251 to select a message content 2211b (second parameter information) is generated, as in a fourth state 2207, an electronic device may output the soft input panel 2271 in the lower end of the screen 2270 such that the user edits (or enters) the message content 2211b. When the user edits the message content 2211b through the soft input panel 2271, the edited message content 2211d may be applied to the content 2211 of a voice command for requesting the execution of a specific task in real time or at a point in time when the editing is completed.

Figure 23:
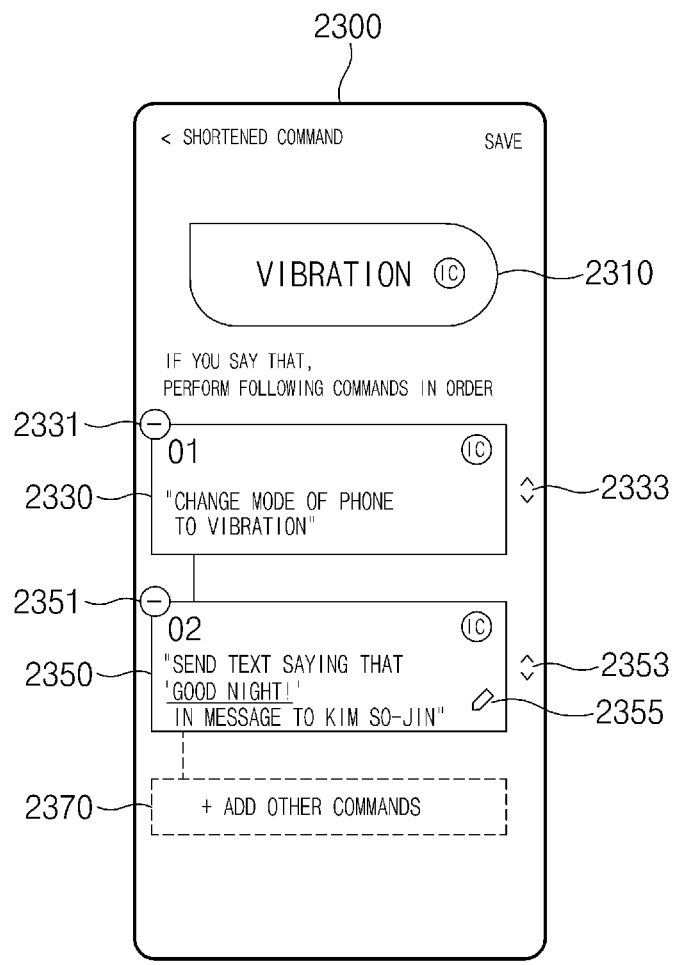
FIG. 23 is a view for describing a method of editing a quick command, according to an embodiment of the present disclosure.

FIG. 23 is a view for describing a method of editing a quick command, according to an embodiment of the present disclosure.

Referring to FIG. 23, an electronic device (e.g., the user terminal 100) may provide an interface such that a quick command item is capable of being edited in a detailed content screen 2300 of a quick command item. For example, the detailed content screen 2300 of the quick command item may include a specified expression 2310 for requesting the execution of a task, information (e.g., information 2330 about a first task or information 2350 about a second task) about at least one task to be performed upon uttering the specified expression 2310, and an additional button 2370 of a task. The information about the task may include the voice command (e.g., "change the mode of a mobile phone to vibration" or "send a text message saying that 'good night' in a message to Kim So-Jin") for requesting the execution of the task.

According to an embodiment, the electronic device may display buttons 2331 and 2351 for deleting the task, and buttons 2333 and 2353 for changing the execution order of the task in an area where the information about the task is displayed or in an area adjacent thereto. For example, when the first deletion button 2331 is selected, the electronic device may delete a first task (e.g., changing to vibration in a mobile phone) from the quick command; and when the second deletion button 2351 is selected, the electronic device may delete a second task (e.g., sending a message) from the quick command. For another example, when the first order change button 2333 is selected, the electronic device may change the execution order of the first task; and when the second order change button 2335 is selected, the electronic device may change the execution order of the second task. When a portion, which faces the upper end of the screen 2300, in the order change buttons 2333 and 2353 is pressed, the execution order of the corresponding task may be changed to a high level by one step; and when a portion, which faces the lower end of the screen 2300, in the order change buttons 2333 and 2353 is pressed, the execution order of the corresponding task may be changed to a low level by one step. For example, when a portion, which faces the lower end of the screen 2300, in the first order change button 2333 is pressed, the order may be changed such that the first task is performed after the second task is performed. For another example, when a portion, which faces the upper end of the screen 2300, in the second order change button 2353 is pressed, the order may be changed such that the second task is performed before the first task is performed.

According to an embodiment, in the case where the changeable portion (e.g., parameter information) is included in content of the voice command for requesting the execution of a task, the electronic device may display an editing button 2355 associated with the changeable portion in an area where the information about the task is displayed or in an area adjacent thereto. When the editing button 2355 is selected, as described in FIG. 22, the electronic device may provide an interface capable of editing the changeable portion.

Figure 24:
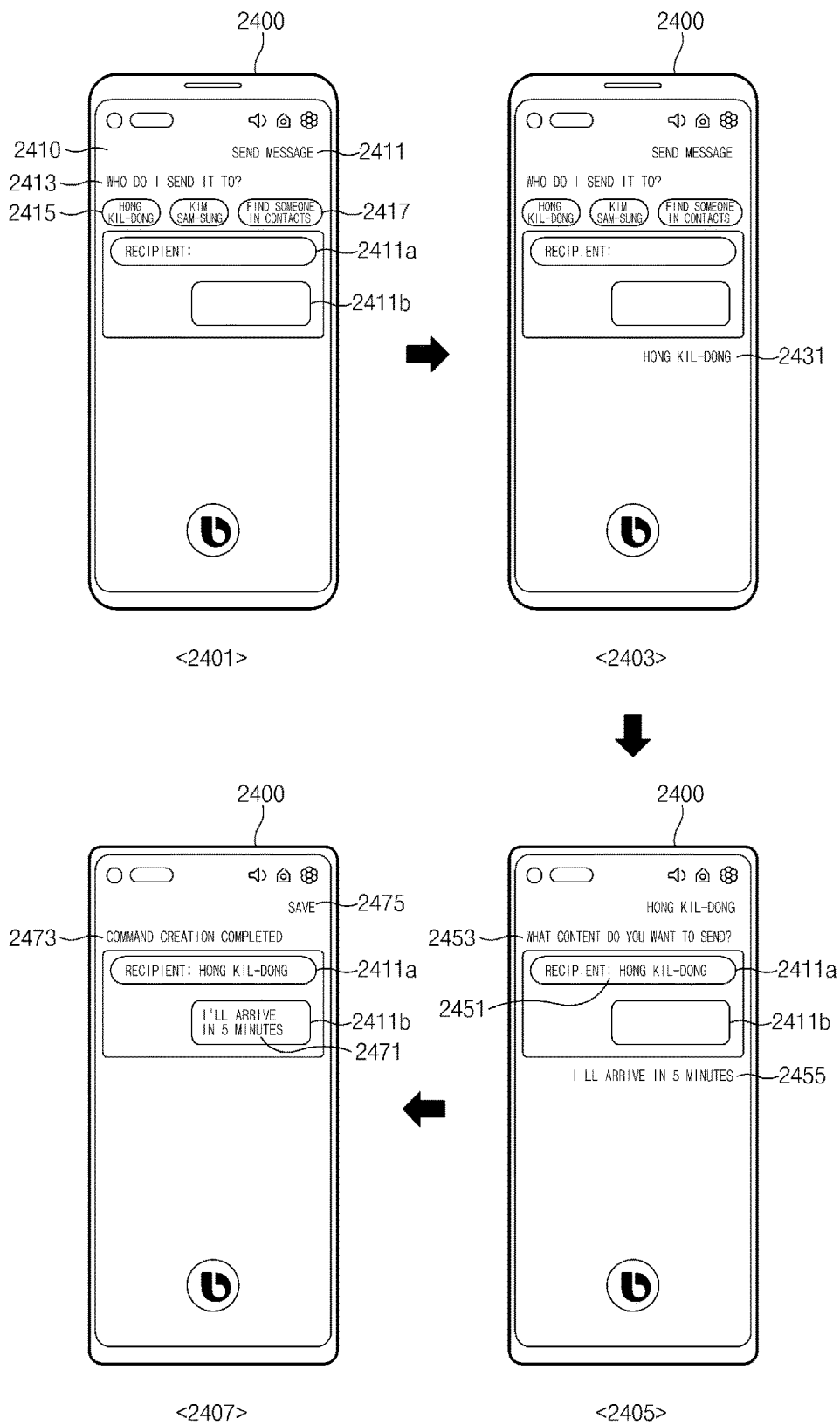
FIG. 24 is a view for describing a method of setting a parameter included in a voice command upon generating a quick command through the utterance of a user, according to an embodiment of the present disclosure.

FIG. 24 is a view for describing a method of setting a parameter included in a voice command upon generating a quick command through the utterance of a user, according to an embodiment of the present disclosure.

Referring to FIG. 24, an electronic device 2400 (e.g., the user terminal 100) may generate (or set) a quick command through the utterance of a user. For example, in addition to a method of generating (or setting) a new quick command based on recommendation, utterance history information, the search of a voice command, or information of a pre-stored quick command, the electronic device 2400 may provide a method of generating (or setting) a new quick command based on a voice command by the utterance of a user.

In the case where the new quick command is generated (or set) based on the voice command by the utterance of the user, the voice command by the utterance of the user may not include all of the information utilized to perform a specific task. For example, in the case where the user utters "send a message", since there is no parameter information utilized to send the message, it is difficult to perform a task corresponding to sending the message. In this case, the electronic device 2400 may provide an interface for additionally receiving information utilized to perform the task.

According to an embodiment, as in a first state 2401, the electronic device 2400 may output a screen 2410 for entering additional information. For example, the screen 2410 for entering the additional information may include a voice command 2411 (e.g., "send a message") uttered by the user, a text 2413 for guiding a user with additional information, hint information 2415 about the additional information, a list selection button 2417 for selecting the additional information, and the additional information (e.g., recipient 2411a or message content 2411b).

The guide text 2413 may include a text that induces the user to enter the additional information. For example, in the case where the recipient 2411a needs to be added, the guide text 2413 may include a text (e.g., "Who do I send it to") that induces the user to enter the recipient 2411a. For another example, in the case where the message content 2411b needs to be added, the guide text 2413 may include a text (e.g., "What content do you want to send?") that induces the user to enter the message content 2411b.

The hint information 2415 may provide a hint associated with the additional information. For example, in the case where the recipient 2411a needs to be added, the hint information 2415 may provide contacts associated with the recently contacted person or the frequently contacted person among persons, which are stored in an address book, as a hint.

The list selection button 2417 may provide a list for selecting the additional information. For example, in the case where the recipient 2411a needs to be added, the address book may be output when the list selection button 2417 is selected.

According to an embodiment, the electronic device 2400 may obtain the additional information through the user's utterance. In this case, as in a second state 2403, the electronic device 2400 may display a user's utterance content 2431 in the screen 2410. The second state 2403 may indicate a state where the recipient 2411a is entered through the user's utterance; as a result, as in a third state 2405, text 2451 (e.g., "Hong Kil-Dong") may be displayed in a field for entering the recipient 2411a to correspond to the user's utterance content 2431. In addition, in the third state 2405, when the message content 2411b is received through the user's utterance, the user's utterance content 2455 may be displayed in the screen 2410; as in a fourth state 2407, a text 2471 (e.g., "I'll arrive in 5 minutes") may be displayed in a field for entering the message content 2411b to correspond to the user's utterance content 2455.

When all of pieces of additional information are obtained, as the fourth state 2407, the electronic device 2400 may output a text 2473 for providing a notification that all the pieces of additional information are entered and a storage button 2475 of a task corresponding to the voice command, in the screen 2410.

Figure 25:
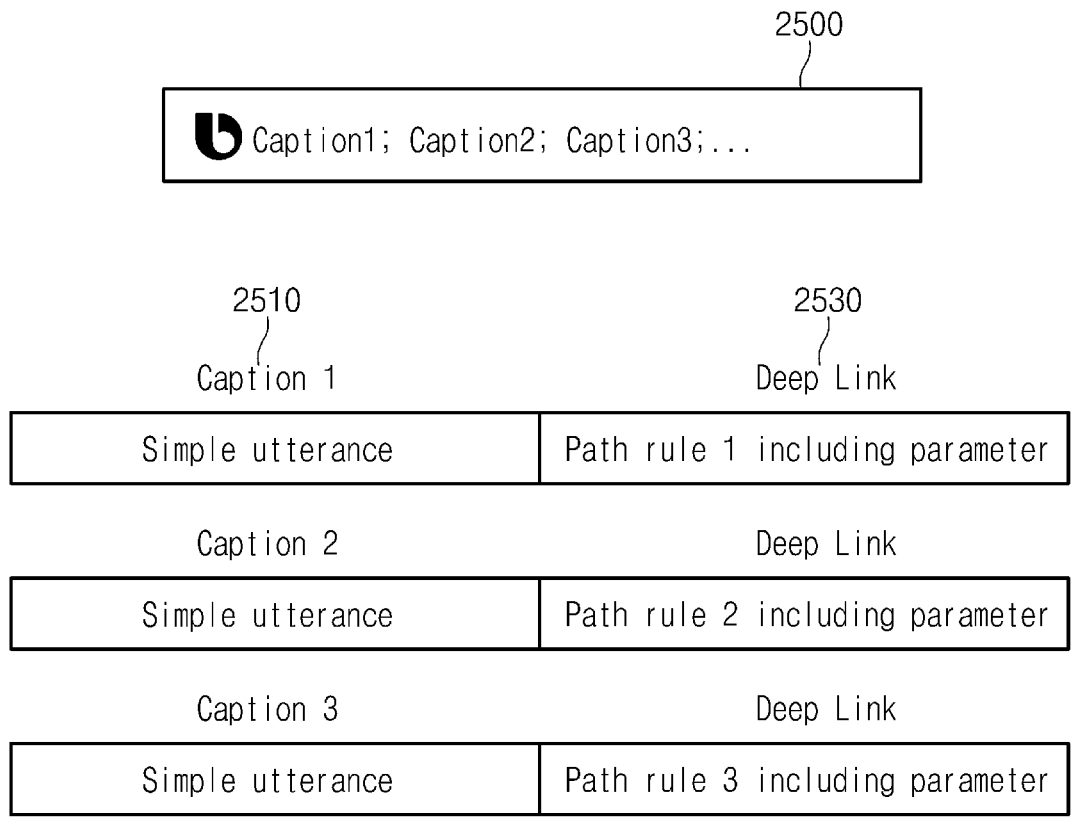
FIG. 25 is a view for describing a method of sharing a quick command, according to an embodiment of the present disclosure.

FIG. 25 is a view for describing a method of sharing a quick command, according to an embodiment of the present disclosure.

Referring to FIG. 25, an electronic device (e.g., the user terminal 100) may share the set quick command with an external electronic device. According to an embodiment, the electronic device may share a quick command with the external electronic device through a link function.

According to an embodiment, the sharing of the quick command through the link function may be performed in a form 2500 in which captions 2510 assigned to the quick command are listed. According to an embodiment, elements included in the link may include the caption 2510 assigned to the quick command, an app version of the user associated with a path rule, and the like. However, the elements included in the link are not limited thereto.

The caption 2510 assigned to the quick command may be to briefly display the user's utterance, and may be to briefly display a representative utterance or an utterance for performing a task. For example, in the case where the user utters "show battery usage history in settings", the caption 2510 may be displayed as "battery usage check", or the like. In an embodiment, the caption 2510 may display the original utterance content, not the simplified utterance content. For example, in the case where the user utters "show battery usage history in settings", the caption 2510 may be also displayed as "show battery usage history in settings".

In the case of the link transmitted without verifying information (e.g., name/version of an app installed by the other party, personal information such as information of contact list, or the like) of the other party, the form 2500 may include a deep link 2530 including the user's utterance and the caption 2510. In the case of the link transmitted after the information of the other party is verified to determine whether the quick command is properly performed, the form 2500 may include the deep link 2530 including the path rule and parameter information and the caption 2510.

The deep link 2530 may include app information (e.g., app name or version information) installed in the electronic device, in which the link in addition to the path rule is generated, OS information, information about a device (e.g., BT headset, smart watch, IOT device, or the like) connected to the electronic device, and the like. The information may be used to reject a transmitted path rule, to perform another app having the similar function, or to recommend the update of OS or an app based on the comparison result between the information and information of the electronic device, when a task is performed through a link received from an external electronic device receiving the link. In addition, a path rule including the parameter may be set in the format of the JSON form. Additionally, the identifier of the path rule may be included in the deep link 2530.

According to an embodiment, the electronic device may upload the quick command generated by the user onto a server (e.g., market) and may download a quick command uploaded by another user form the server. For example, the electronic device may upload the quick command onto the server in the format of the quick command data 1000 described in FIG. 10.

According to an embodiment, the electronic device may handle an error associated with the quick command. For example, the electronic device may normally perform tasks according to the quick command at a point in time when the quick command is initially generated; however, the stored quick command may not be performed normally by the change in the electronic device. Since the quick command is not performed normally, when the execution is in partial landing, the quick command may be revised by reflecting the executed result in the partial landing to the quick command. For example, a task of "send a text message saying that 'hi' to Kim Cheol-Soo" may be mapped to the quick command saying that "Kim Cheol-Soo". Since person information of "Kim Cheol-Soo" is stored in an address book at a point in time when the quick command is generated, the task may be performed normally; however, in the case where the person information of "Kim Cheol-Soo" is deleted from the address book afterwards, since a recipient is not found, the execution may be in the partial landing. In this case, when a task saying that "send a text message saying that 'hi' to Kim Cheol-Soo" is performed after the quick command saying that "Kim Cheol-Soo" is entered, a process of searching for "Kim Cheol-Soo" in the address book may be in the partial landing; in this operation, a user is requested to enter the recipient again. Afterwards, when the user enters a recipient, the electronic device may perform the task up to the final action and may provide the user with a screen for revising the quick command corresponding to the task. In other words, when the quick command including a path rule which is not filled with a parameter (or when a parameter included in a path rule is not used in the electronic device), the electronic device may perform the final action, may receive a user input in the partial landing to perform the task up to the final action, and may provide a screen for revising the quick command after the execution of the task is completed. Accordingly, the electronic device may induce the user to revise the quick command by entering a parameter. In this case, the electronic device may provide the information, which is previously entered by the user, as a hint in the partial landing.

Figure 26:
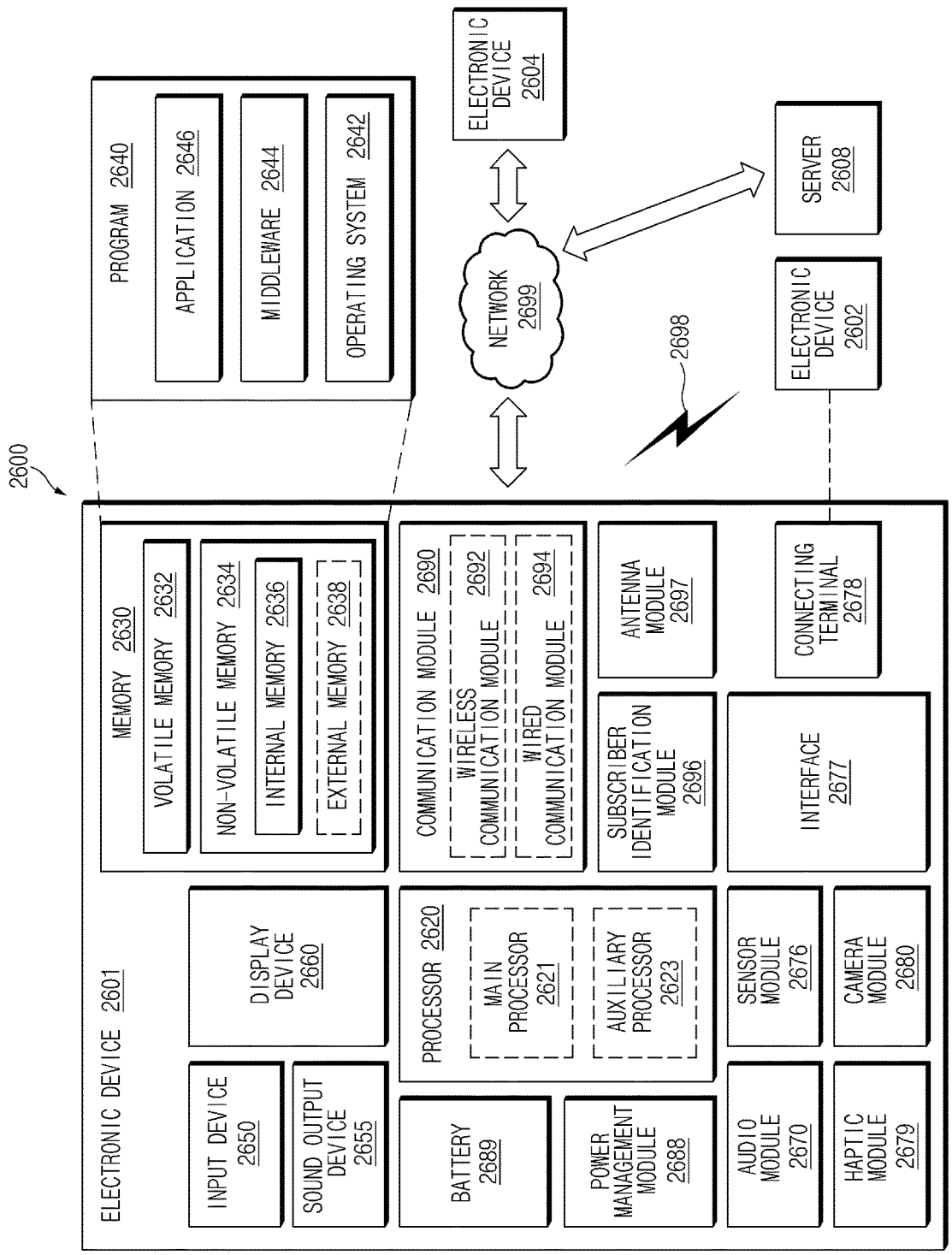
FIG. 26 is a block diagram illustrating an electronic device in a network environment according to various embodiments of the present disclosure.

FIG. 26 is a block diagram illustrating an electronic device 2601 in a network environment 2600 according to various embodiments. Referring to FIG. 26, the electronic device 2601 in the network environment 2600 may communicate with an electronic device 2602 via a first network 2698 (e.g., a short-range wireless communication network), or an electronic device 2604 or a server 2608 via a second network 2699 (e.g., a long-range wireless communication network). According to an embodiment, the electronic device 2601 may communicate with the electronic device 2604 via the server 2608. According to an embodiment, the electronic device 2601 may include a processor 2620, memory 2630, an input device 2650, a sound output device 2655, a display device 2660, an audio module 2670, a sensor module 2676, an interface 2677, a haptic module 2679, a camera module 2680, a power management module 2688, a battery 2689, a communication module 2690, a subscriber identification module (SIM) 2696, or an antenna module 2697. In some embodiments, at least one (e.g., the display device 2660 or the camera module 2680) of the components may be omitted from the electronic device 2601, or one or more other components may be added in the electronic device 2601. In some embodiments, some of the components may be implemented as single integrated circuitry. For example, the sensor module 2676 (e.g., a fingerprint sensor, an iris sensor, or an illuminance sensor) may be implemented as embedded in the display device 2660 (e.g., a display).

The processor 2620 may execute, for example, software (e.g., a program 2640) to control at least one other component (e.g., a hardware or software component) of the electronic device 2601 coupled with the processor 2620, and may perform various data processing or computation. According to an embodiment, as at least part of the data processing or computation, the processor 2620 may load a command or data received from another component (e.g., the sensor module 2676 or the communication module 2690) in volatile memory 2632, process the command or the data stored in the volatile memory 2632, and store resulting data in non-volatile memory 2634. According to an embodiment, the processor 2620 may include a main processor 2621 (e.g., a central processing unit (CPU) or an application processor (AP)), and an auxiliary processor 2623 (e.g., a graphics processing unit (GPU), an image signal processor (ISP), a sensor hub processor, or a communication processor (CP)) that is operable independently from, or in conjunction with, the main processor 2621. Additionally or alternatively, the auxiliary processor 2623 may be adapted to consume less power than the main processor 2621, or to be specific to a specified function. The auxiliary processor 2623 may be implemented as separate from, or as part of the main processor 2621.

The auxiliary processor 2623 may control at least some of functions or states related to at least one component (e.g., the display device 2660, the sensor module 2676, or the communication module 2690) among the components of the electronic device 2601, instead of the main processor 2621 while the main processor 2621 is in an inactive (e.g., sleep) state, or together with the main processor 2621 while the main processor 2621 is in an active state (e.g., executing an application). According to an embodiment, the auxiliary processor 2623 (e.g., an image signal processor or a communication processor) may be implemented as part of another component (e.g., the camera module 2680 or the communication module 2690) functionally related to the auxiliary processor 2623.

The memory 2630 may store various data used by at least one component (e.g., the processor 2620 or the sensor module 2676) of the electronic device 2601. The various data may include, for example, software (e.g., the program 2640) and input data or output data for a command related thererto. The memory 2630 may include the volatile memory 2632 or the non-volatile memory 2634.

The program 2640 may be stored in the memory 2630 as software, and may include, for example, an operating system (OS) 2642, middleware 2644, or an application 2646.

The input device 2650 may receive a command or data to be used by other component (e.g., the processor 2620) of the electronic device 2601, from the outside (e.g., a user) of the electronic device 2601. The input device 2650 may include, for example, a microphone, a mouse, or a keyboard.

The sound output device 2655 may output sound signals to the outside of the electronic device 2601. The sound output device 2655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2660 may visually provide information to the outside (e.g., a user) of the electronic device 2601. The display device 2660 may include, for example, a display, a hologram device, or a projector and control circuitry to control a corresponding one of the display, hologram device, and projector. According to an embodiment, the display device 2660 may include touch circuitry adapted to detect a touch, or sensor circuitry (e.g., a pressure sensor) adapted to measure the intensity of force incurred by the touch.

The audio module 2670 may convert a sound into an electrical signal and vice versa. According to an embodiment, the audio module 2670 may obtain the sound via the input device 2650, or output the sound via the sound output device 2655 or a headphone of an external electronic device (e.g., an electronic device 2602) directly (e.g., wiredly) or wirelessly coupled with the electronic device 2601.

The sensor module 2676 may detect an operational state (e.g., power or temperature) of the electronic device 2601 or an environmental state (e.g., a state of a user) external to the electronic device 2601, and then generate an electrical signal or data value corresponding to the detected state. According to an embodiment, the sensor module 2676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2677 may support one or more specified protocols to be used for the electronic device 2601 to be coupled with the external electronic device (e.g., the electronic device 2602) directly (e.g., wiredly) or wirelessly. According to an embodiment, the interface 2677 may include, for example, a high definition multimedia interface (HDMI), a universal serial bus (USB) interface, a secure digital (SD) card interface, or an audio interface.

A connecting terminal 2678 may include a connector via which the electronic device 2601 may be physically connected with the external electronic device (e.g., the electronic device 2602). According to an embodiment, the connecting terminal 2678 may include, for example, a HDMI connector, a USB connector, a SD card connector, or an audio connector (e.g., a headphone connector), The haptic module 2679 may convert an electrical signal into a mechanical stimulus (e.g., a vibration or a movement) or electrical stimulus which may be recognized by a user via his tactile sensation or kinesthetic sensation. According to an embodiment, the haptic module 2679 may include, for example, a motor, a piezoelectric element, or an electric stimulator.

The camera module 2680 may capture a still image or moving images. According to an embodiment, the camera module 2680 may include one or more lenses, image sensors, image signal processors, or flashes.

The power management module 2688 may manage power supplied to the electronic device 2601. According to an embodiment, the power management module 2688 may be implemented as at least part of, for example, a power management integrated circuit (PMIC).

The battery 2689 may supply power to at least one component of the electronic device 2601. According to an embodiment, the battery 2689 may include, for example, a primary cell which is not rechargeable, a secondary cell which is rechargeable, or a fuel cell.

The communication module 2690 may support establishing a direct (e.g., wired) communication channel or a wireless communication channel between the electronic device 2601 and the external electronic device (e.g., the electronic device 2602, the electronic device 2604, or the server 2608) and performing communication via the established communication channel. The communication module 2690 may include one or more communication processors that are operable independently from the processor 2620 (e.g., the application processor (AP)) and supports a direct (e.g., wired) communication or a wireless communication. According to an embodiment, the communication module 2690 may include a wireless communication module 2692 (e.g., a cellular communication module, a short-range wireless communication module, or a global navigation satellite system (GNSS) communication module) or a wired communication module 2694 (e.g., a local area network (LAN) communication module or a power line communication (PLC) module). A corresponding one of these communication modules may communicate with the external electronic device via the first network 2698 (e.g., a short-range communication network, such as Bluetooth™, wireless-fidelity (Wi-Fi) direct, or infrared data association (IrDA)) or the second network 2699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2692 may identify and authenticate the electronic device 2601 in a communication network, such as the first network 2698 or the second network 2699, using subscriber information (e.g., international mobile subscriber identity (IMSI)) stored in the subscriber identification module 2696.

The antenna module 2697 may transmit or receive a signal or power to or from the outside (e.g., the external electronic device) of the electronic device 2601. According to an embodiment, the antenna module 2697 may include one or more antennas, and, therefrom, at least one antenna appropriate for a communication scheme used in the communication network, such as the first network 2698 or the second network 2699, may be selected, for example, by the communication module 2690 (e.g., the wireless communication module 2692). The signal or the power may then be transmitted or received between the communication module 2690 and the external electronic device via the selected at least one antenna.

At least some of the above-described components may be coupled mutually and communicate signals (e.g., one or more instructions or data) therebetween via an inter-peripheral communication scheme (e.g., a bus, general purpose input and output (GPIO), serial peripheral interface (SPI), or mobile industry processor interface (MIPI)).

According to an embodiment, one or more instructions or data may be transmitted or received between the electronic device 2601 and the external electronic device 2604 via the server 2608 coupled with the second network 2699. Each of the electronic devices 2602 and 2604 may be a device of a same type as, or a different type, from the electronic device 2601. According to an embodiment, all or some of operations to be executed at the electronic device 2601 may be executed at one or more of the external electronic devices 2602, 2604, or 2608. For example, if the electronic device 2601 should perform a function or a service automatically, or in response to a request from a user or another device, the electronic device 2601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2601. The electronic device 2601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2640) including one or more instructions that are stored in a storage medium (e.g., internal memory 2636 or external memory 2638) that is readable by a machine (e.g., the electronic device 2601). For example, a processor (e.g., the processor 2620) of the machine (e.g., the electronic device 2601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Specifically, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a touchscreen;
a microphone;
a wireless communication circuit;
at least one processor operatively coupled to the touchscreen, the microphone, and the wireless communication circuit; and
at least one memory storing programming instructions executable by the at least one processor to cause the electronic device to:
receive a first user utterance through the microphone;
transmit, by the wireless communication circuit, the received first user utterance to an external server;
receive, by the wireless communication circuit, first text data generated by the external server;
when the first text data includes at least one pre-stored word, phrase, and sentence, identify a plurality of tasks mapped to the at least one pre-stored word, phrase, and sentence;
determine whether there is a relationship between the identified plurality of tasks;
execute the identified plurality of tasks sequentially if there is the relationship between the identified plurality of tasks; and
execute the identified plurality of tasks in parallel if there is no the relationship between the identified plurality of tasks.

2. The electronic device of claim 1, wherein the identified plurality of tasks includes a first task and a second task, and
wherein the at least one memory stores first information associated with the first task and a first identifier, and second information associated with the second task and a second identifier.

3. The electronic device of claim 1, wherein the at least one memory stores information mapped to the at least one pre-stored word, phrase, and sentence, and wherein the mapped information includes information associated with to the plurality of tasks.

4. The electronic device of claim 3, wherein the information associated with the plurality of tasks includes at least one of:
a respective type for each of the plurality of tasks, a sequence of states of the electronic device relevant to executing the plurality of tasks, a voice command detectable to request the execution of the plurality of tasks, feedback information according to the execution of the plurality of tasks, and information indicating a last task among the plurality of tasks.

5. The electronic device of claim 4, wherein the at least one memory further stores instructions executable by the at least one processor to cause the electronic device to:
determine whether to process at least part of the information associated with the plurality of tasks; or
transmit the at least part of information associated with the plurality of tasks to at least one of the external server and a second external server, depending on the respective type of each of the plurality of tasks.

6. An electronic device, comprising:
a microphone;
a communication circuit;
at least one processor electrically coupled to the microphone and the communication circuit; and
a memory storing programming instructions executable by the at least one processor to cause the electronic device to:
store a first expression mapped to first information associated with a plurality of first tasks,
receive a first voice input of a user through the microphone,
transmit the first voice input to an external server through the communication circuit;
receive first text data generated by the external server to the transmitted first voice input from the external server through the communication circuit;
search the memory for any stored expression matching the first text data;
when the first expression is identified as matching the first text data, transmit the first information associated with the plurality of first tasks to the external server through the communication circuit;
receive, from the external server through the communication circuit, second information indicating a sequence of states of the electronic device related to executing the plurality of first tasks identified by the external server as matching the first information; and
execute the plurality of first tasks according to the second information,
wherein the first expression includes at least one of specified word, a specified phrase, and a specified sentence.

7. The electronic device of claim 6, wherein the first information associated with the plurality of first tasks includes at least one of:
a respective type for each of the plurality of first tasks, a sequence of states of the electronic device relevant to executing the plurality of first tasks, a voice command detectable to request the execution of the plurality of first tasks, feedback information according to the execution of the plurality of first tasks, and information indicating a last task among the plurality of first tasks.

8. The electronic device of claim 6, wherein the memory further stores instructions that, when executed, cause the processor to:
output utterance history information stored in the memory when receiving a user input;
when one of the history information is selected, verify at least one second voice command and a plurality of second tasks corresponding a selected utterance history information;
receive a second expression for an execution of the plurality of second tasks through the microphone; and
map and store the second expression and the plurality of second tasks.

9. The electronic device of claim 6, wherein the memory further stores instructions executable by the at least one processor to cause the electronic device to:
when the second information is relating to a plurality of execution sequences of the first tasks, determine one execution sequence among the plurality of execution sequences based on another user input.

10. The electronic device of claim 6, wherein the memory further stores instructions executable by the at least one processor to cause the electronic device to:

prompt the user to utter the first expression more than a specified number of times; and recognize the first expression based on repeated analysis of voice input according to the user's utterance.

11. The electronic device of claim 6, wherein the memory further stores instructions executable by the at least one processor to cause the electronic device to:

output a hint for inducing the user to revise a parameter when the parameter in the sequence of states of the electronic device is not used in the electronic device.

12. The electronic device of claim 6, wherein the memory further stores instructions executable by the at least one processor to cause the electronic device to:

generate and display an interface for editing the first expression and the first information associated with the plurality of first tasks mapped to the first expression.

13. A voice data processing method in an electronic device, comprising:

storing by a memory a first expression mapped to first information associated with a plurality of first tasks;

receiving a first voice input of a user through a microphone;

transmitting the received first voice input to an external server through a communication circuit;

receiving a first text data generated by application of automatic speech recognition (ASR) by the external server to the first voice input, from the external server through the communication circuit;

searching, in the memory, for any stored expression matching the first text data;

when the first expression is identified as matching the first text data, transmitting the first information associated with the plurality of first tasks to the external server through the communication circuit;

receiving, from the external server through the communication circuit, second information indicating a sequence of states of the electronic device related to executing the plurality of first tasks identified by the external server as matching the first information; and executing the plurality of first tasks according to the second information, wherein the first expression includes at least one of a specified word, a specified phrase, and a specified sentence.

14. The method of claim 13, further comprising:

mapping a second expression to third information associated with a plurality of second tasks that are at least partly different from the plurality of first tasks; and storing the mapping in the memory in association with at least one of recommendation information, utterance history information of the user, at least one pre-stored second voice command, the first expression, and a second voice input received through the microphone, wherein the second expression includes at least one of a specified word, a specified phrase, and a specified sentence.

15. The method of claim 14, wherein the mapping of the second expression to the third information associated with the plurality of second tasks is further associated with the second voice input, and wherein when a portion of fourth information indicating a sequence of states of the electronic device for executing the plurality of second tasks is not present in second text data corresponding to the second voice input, requesting entry of fifth information corresponding to the portion of the fourth information.

16. The method of claim 15, wherein requesting entry of the fifth information comprises at least one of outputting a prompt through a speaker, and outputting the prompt through a touchscreen.

17. The method of claim 15, wherein requesting entry of the fifth information comprises outputting a prompt through a touchscreen.

18. The method of claim 17, wherein the prompt comprises at least one of a hint associated with the fifth information, and a list from which an entry is selectable to indicate the fifth information.

19. The method of claim 13, further comprising:

generating and displaying an interface for editing the first expression and the first information associated with the plurality of first tasks mapped to the first expression.

* * * * *